United States Patent
Miyoshi

(10) Patent No.: US 10,642,649 B2
(45) Date of Patent: May 5, 2020

(54) INFORMATION PROCESSING DEVICE AND SYSTEM FOR SUPPRESSING DEGRADATION OF PROCESSING PERFORMANCE OF PROGRAM, METHOD FOR CONTROLLING INFORMATION PROCESSING SYSTEM, AND NON-TRANSITORY COMPUTER-READABLE STORAGE MEDIUM

(71) Applicant: FUJITSU LIMITED, Kawasaki-shi, Kanagawa (JP)

(72) Inventor: Takashi Miyoshi, Ohta (JP)

(73) Assignee: FUJITSU LIMITED, Kawasaki (JP)

( * ) Notice: Subject to any disclaimer, the term of this patent is extended or adjusted under 35 U.S.C. 154(b) by 27 days.

(21) Appl. No.: 15/428,608

(22) Filed: Feb. 9, 2017

(65) Prior Publication Data

US 2017/0262313 A1    Sep. 14, 2017

(30) Foreign Application Priority Data

Mar. 8, 2016 (JP) ................. 2016-044670

(51) Int. Cl.
*G06F 9/48* (2006.01)

(52) U.S. Cl.
CPC ................. *G06F 9/4881* (2013.01)

(58) Field of Classification Search
CPC ................................ G06F 9/4881
See application file for complete search history.

(56) References Cited

U.S. PATENT DOCUMENTS

| 2004/0254779 A1 | 12/2004 | Wang et al. |
| 2013/0145431 A1 | 6/2013 | Kruglick |
| 2013/0246679 A1 | 9/2013 | Miyoshi |
| 2016/0285780 A1* | 9/2016 | Strijkers ................. H04L 67/10 |

FOREIGN PATENT DOCUMENTS

| JP | 2005-11344 | 1/2005 |
| JP | 2013-45219 | 3/2013 |
| JP | 2013-196206 | 9/2013 |
| JP | 2015-507234 | 3/2015 |

OTHER PUBLICATIONS

Kumbhare, et al., AXI Chip2Chip Aurora Reference Design for Real-Time Video Applications (Year: 2014).*

* cited by examiner

*Primary Examiner* — Charlie Sun
(74) *Attorney, Agent, or Firm* — Staas & Halsey LLP

(57) ABSTRACT

An apparatus for processing information includes: a processor configured to execute a program; a first programmable circuit into which a processing circuit that executes data processing in accordance with an instruction from the processor is programmed; and a router circuit coupled to the processor, the first programmable circuit, and a router circuit of other apparatus, wherein the router circuit of the apparatus is configured to execute a routing process of information transferred between the processor and the first programmable circuit or between the processor and a first programmable circuit of the other information processing apparatus.

11 Claims, 24 Drawing Sheets

FIG. 9

| SERVER NAME | CPU CORE NAME/ FUNCTION BLOCK NAME | CR1 | CR2 | CR3 | CR4 | BLK1 | BLK2 | BLK3 | BLK4 | BLK5 | BLK6 | BLK7 | BLK8 | BLK9 |
|---|---|---|---|---|---|---|---|---|---|---|---|---|---|---|
| SV00 | FLG | 1 | 1 | 0 | 0 | 1 | 1 | 1 | 1 | 1 | 1 | 1 | 1 | 0 |
|  | SW NAME/IP NAME | SW1 | SW2 |  |  | IP1 | IP1 | IP1 | IP2 | IP2 | IP2 | IP2 | IP2 |  |
| SV10 | FLG | 1 | 1 | 1 | 1 | 1 | 1 | 1 | 1 | 1 | 1 | 1 | 1 | 0 |
|  | SW NAME/IP NAME | SWa | SWb | SWc | SWd | IPa | IPa | IPb | IPb | IPb | IPc | IPc | IPc |  |
| SV20 | FLG | 1 | 1 | 1 | 0 | 1 | 1 | 1 | 1 | 1 | 1 | 1 | 1 | 1 |
|  | SW NAME/IP NAME | SWe | SWf | SWg |  | IPe | IPf | IPf | IPf | IPg | IPg | IPd | IPd | IPd |
| SV01 | FLG | 1 | 1 | 1 | 1 | 1 | 1 | 1 | 1 | 1 | 1 | 1 | 1 | 1 |
|  | SW NAME/IP NAME | SWh | SWi | SWj | SWk | IPh | IPh | IPi | IPi | IPi | IPj | IPj | IPk | IPk |
| SV11 | FLG | 1 | 1 | 1 | 1 | 1 | 1 | 1 | 1 | 1 | 0 | 0 | 0 | 0 |
|  | SW NAME/IP NAME | SW3 | SW4 | SW5 | SW6 | IP3 | IP4 | IP4 | IP5 | IP6 |  |  |  |  |
| SV21 | FLG | 1 | 1 | 1 | 1 | --- | --- | --- | --- | --- | 1 | 1 | 1 | 1 |
|  | SW NAME/IP NAME | SWm | SWn | SWo | SWp | IPm | IPm | IPn | IPn | IPo | IPo | IPo | IPp | 0 |
| --- | --- | --- | --- | --- | --- | --- | --- | --- | --- | --- | --- | --- | --- | --- |
| SV22 | FLG | 1 | 1 | 1 | 1 | 1 | 1 | 1 | 1 | 1 | 1 | 0 | 0 | 0 |
|  | SW NAME/IP NAME | SW7 | SW8 | SW9 | SW10 | IP7 | IP7 | IP8 | IP9 | IP9 | IP10 |  |  |  |

MTBL

FIG. 10

RTTBL OF RT20

| DESTINATION ID | P# |
|---|---|
| RT00 | P1 |
| RT01 | P3 |
| RT02 | P2 |
| RT10 | P0 |
| RT11 | P3 |
| RT12 | P2 |
| RT21 | P3 |
| RT22 | P2 |

RTTBL OF RT21

| DESTINATION ID | P# |
|---|---|
| RT00 | P2 |
| RT01 | P1 |
| RT02 | P3 |
| RT10 | P2 |
| RT11 | P0 |
| RT12 | P3 |
| RT20 | P2 |
| RT22 | P3 |

RTTBL OF RT22

| DESTINATION ID | P# |
|---|---|
| RT00 | P3 |
| RT01 | P2 |
| RT02 | P1 |
| RT10 | P3 |
| RT11 | P2 |
| RT12 | P0 |
| RT20 | P3 |
| RT21 | P2 |

RTTBL OF RT10

| DESTINATION ID | P# |
|---|---|
| RT00 | P0 |
| RT01 | P3 |
| RT02 | P2 |
| RT11 | P3 |
| RT12 | P2 |
| RT20 | P1 |
| RT21 | P3 |
| RT22 | P2 |

RTTBL OF RT11

| DESTINATION ID | P# |
|---|---|
| RT00 | P2 |
| RT01 | P0 |
| RT02 | P3 |
| RT10 | P2 |
| RT12 | P3 |
| RT20 | P2 |
| RT21 | P1 |
| RT22 | P3 |

RTTBL OF RT12

| DESTINATION ID | P# |
|---|---|
| RT00 | P3 |
| RT01 | P2 |
| RT02 | P0 |
| RT10 | P3 |
| RT11 | P2 |
| RT20 | P3 |
| RT21 | P2 |
| RT22 | P1 |

RTTBL OF RT00

| DESTINATION ID | P# |
|---|---|
| RT01 | P3 |
| RT02 | P2 |
| RT10 | P1 |
| RT11 | P3 |
| RT12 | P2 |
| RT20 | P0 |
| RT21 | P3 |
| RT22 | P2 |

RTTBL OF RT01

| DESTINATION ID | P# |
|---|---|
| RT00 | P2 |
| RT02 | P3 |
| RT10 | P2 |
| RT11 | P1 |
| RT12 | P3 |
| RT20 | P2 |
| RT21 | P0 |
| RT22 | P3 |

RTTBL OF RT02

| DESTINATION ID | P# |
|---|---|
| RT00 | P3 |
| RT01 | P2 |
| RT10 | P3 |
| RT11 | P2 |
| RT12 | P1 |
| RT20 | P3 |
| RT21 | P2 |
| RT22 | P0 |

INFORMATION PROCESSING DEVICE AND SYSTEM FOR SUPPRESSING DEGRADATION OF PROCESSING PERFORMANCE OF PROGRAM, METHOD FOR CONTROLLING INFORMATION PROCESSING SYSTEM, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-044670, filed on Mar. 8, 2016, the entire contents of which are incorporated herein by reference.

FIELD

The embodiments discussed herein are related to an apparatus and a system for processing information, a method for controlling an information processing system, and a non-transitory computer-readable storage medium.

BACKGROUND

A technique has been proposed in which a plurality of virtual machines operating on a server are individually coupled to field-programmable gate arrays (FPGAs) mounted on an FPGA board such that data processing is executed at a high speed.

Another technique has been proposed in which one of servers that execute software functions and one of FPGAs that execute hardware functions are coupled to each other by a coupling unit such that data processing is executed by the server and the FPGA.

A further technique has been proposed in which one of servers and a graphics processing unit (GPU) or an FPGA that functions as an accelerator are switchably coupled to each other by a switch that is controlled by a management server.

An emulator has been proposed which programs logics of an emulation target in an FPGA mounted on a resource board together with a memory and so forth and emulates operation of an electronic apparatus.

As examples of the related art, Japanese National Publication of International Patent Publication No. 2015-507234, Japanese Laid-open Patent Publication No. 2013-45219, Japanese Laid-open Patent Publication No. 2013-196206 and Japanese Laid-open Patent Publication No. 2005-11344 are known.

SUMMARY

According to an aspect of the embodiment, an apparatus for processing information includes: a processor configured to execute a program; a first programmable circuit into which a processing circuit that executes data processing in accordance with an instruction from the processor is programmed; and a router circuit coupled to the processor, the first programmable circuit of the apparatus, and a router circuit of other apparatus, wherein the router circuit of the apparatus is configured to execute a routing process of information transferred between the processor and the first programmable circuit of the apparatus or between the processor and a first programmable circuit of the other apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a view illustrating an example of a management table in a management server depicted in FIG. 3;

FIG. 10 is a view illustrating an example of a routing table depicted in FIG. 5;

DESCRIPTION OF EMBODIMENTS

Where a server and an FPGA are coupled to each other through a coupling unit or a switch in common, the coupling route that couples the server and the FPGA to each other is longer than that where the server and the FPGA are coupled directly to each other. If the transfer speed of information between the server and the FPGA is dropped by the longer coupling route, this gives rise to a problem that the processing performance of software executed by the server degrades.

On the other hand, where a server and an FPGA are coupled directly to each other, the number of pieces of software which can be incorporated in the server and make a target of speeding up depends upon the circuit scale of the FPGA coupled to the server. For example, if the FPGA may incorporate only one processing circuit that operates under the control of software operating in the server, the server allows operation of only one piece of software corresponding to the one processing circuit. This gives rise to a problem that there is waste in resources.

As one aspect of the present embodiment, provided are solutions for being able to deploy a program executed by a processor and a processing circuit in a plurality of information processing apparatus without degrading the processing performance of the program.

In the following, embodiments are described with reference to the drawings.

Figure 1:
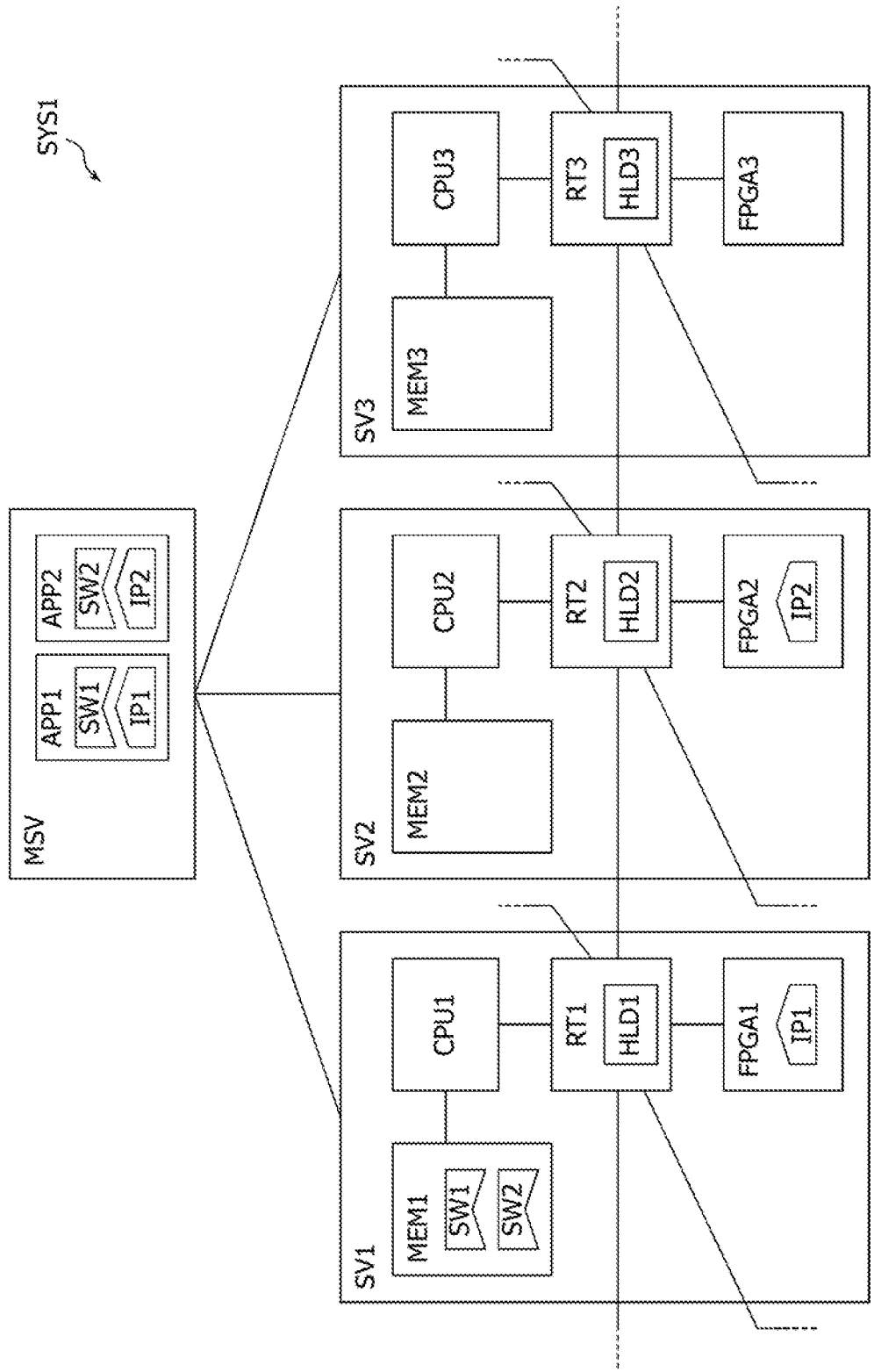
FIG. 1 is a block diagram depicting an embodiment of an information processing apparatus, an information processing system, a control method for an information processing system and a control program for an information processing system.

FIG. 1 depicts an embodiment of an information processing apparatus, an information processing system, a control method for an information processing system and a control program for an information processing system. An information processing system SYS1 depicted in FIG. 1 includes a plurality of servers SV (SV1, SV2 and SV3), and a management server MSV that manages the plurality of servers SV. Each server SV is an example of an apparatus for information processing (e.g. an information processing apparatus), and the management server MSV is an example of a management apparatus.

The management server MSV has a function for deploying applications APP (APP1 and APP2) to the servers SV. Each application APP includes software SW (SW1 or SW2) and circuit information of an intellectual property (IP) core IP (IP1 and IP2). Each piece of the software SW is an example of a program executed by a processor central processing unit (CPU). Each IP core IP is an example of a processing circuit that executes data processing based on an instruction from the processor CPU and includes circuit information for implementing a logical function of information processing such as data processing. For example, each IP core IP functions as a hardware accelerator. It is to be noted that the applications APP may be retained outside the management server MSV and managed outside the management server MSV.

Each server SV includes a processor CPU (CPU1, CPU2 or CPU3), a memory MEM (MEM1, MEM2 or MEM3), a router unit RT (RT1, RT2 or RT3), and a programmable unit FPGA (FPGA1, FPGA2 or FPGA3). Each programmable unit FPGA is an example of a first programmable unit. For example, the servers SV are disposed at positions at which the wiring length of a wiring line that couples the router units RT to each other is as short as possible. The router units RT may be coupled by a mesh network or may be coupled by a torus network. In the following description, each server SV is referred to also as node.

Each processor CPU executes software SW (SW1 and/or SW2) stored in the memory MEM of the own node. In each programmable unit FPGA, an IP core IP (IP1 or IP2) is programmed. Each IP core IP executes data processing based on an instruction from the software SW executed by the processor CPU of the own node or a different node. In FIG. 1, the software SW1 and SW2 is stored in the memory MEM1 of the server SV1 and executed by the processor CPU1 of the server SV1. The software SW1 and SW2 may be executed by each of a plurality of CPU cores incorporated in the processor CPU1 or may be executed by each of a plurality of virtual machines activated by the processor CPU1. The IP core IP1 is programmed in the programmable unit FPGA1 of the server SV1 and the IP core IP2 is programmed in the programmable unit FPGA2 of the server SV2.

Each router unit RT includes a retention unit HLD (HLD1, HLD2 or HLD3) that retains route information indicative of a transfer route of information transferred between a processor CPU that executes the software SW and the programmable unit FPGA in which the IP core IP is programmed. Each router unit RT is coupled to the processor CPU of the own node, the programmable unit FPGA of the own node, and the router unit RT of a different node. Each router unit RT executes a routing process of information transferred among the processor CPU of the own node, the programmable unit FPGA of the own node and the programmable unit FPGA of a different node. The router unit RT of a different node is an example of a different router unit and the programmable unit FPGA of a different node is an example of a different first programmable unit.

In the information processing system SYS1 depicted in FIG. 1, a router unit RT is provided in each server SV and the router units RT are coupled to each other to make it possible to transfer information between each processor CPU and the programmable unit FPGA of a different node. Consequently, an IP core IP may be incorporated in the programmable unit FPGA of the own node or in the programmable unit FPGA of a different node.

For example, even if the programmable unit FPGA1 does not have a sufficient programmable area for installing the IP core IP2, the IP core IP2 may be incorporated in the programmable unit FPGA2 of a node different from the node in which the software SW2 is incorporated as depicted in FIG. 1. For example, the restraint that software SW and an IP core IP are deployed in one server SV may be loosened. As a result, it may become possible to efficiently deploy software SW and IP cores IP dispersedly in a plurality of servers SV in comparison with an alternative case in which software SW and IP cores IP are deployed in one server SV, and the performance of the information processing system SYS1 may be improved.

Furthermore, in the information processing system SYS1 depicted in FIG. 1, a router unit RT is provided in each server SV and the router units RT are coupled to each other. Consequently, also where software SW and IP cores IP are deployed dispersedly in a plurality of servers SV, information may be transferred between a processor CPU and an IP core IP without the intervention of a switch apparatus or the like disposed outside the servers SV. Accordingly, the transfer speed of information may be improved in comparison with an alternative case in which information is transferred between a processor CPU and an IP core IP through a switch apparatus or the like disposed outside the servers SV. As a result, software SW and IP cores IP may be deployed in a plurality of servers SV without degrading the processing performance of software SW executed by a processor CPU.

It is to be noted that, by deploying an application APP (SW and IP) in the memory MEM and the programmable unit FPGA in one server SV, transfer of information between the software SW and the IP core IP may be executed within the one server SV. In this case, the transfer time period of information may be reduced in comparison with an alternative case in which information is transferred between software SW and IP cores IP disposed across two servers SV, and the transfer speed of information may be improved. That is, as the number of router units RT used for transfer of information decreases, the transfer speed of information may be improved. Therefore, by determining a server SV in which to deploy an application APP in accordance with specifications of the transfer speed of information between software SW and an IP core IP, the specifications of the processing performance of the software SW executed by the processor CPU may be satisfied.

In contrast, for example, where a plurality of processors CPU and a plurality of programmable units FPGA are coupled to each other through a switch apparatus in common, transfer of information between a processor CPU and a programmable unit FPGA is executed through the switch apparatus. The switch apparatus is shared for coupling by the plurality of processors CPU and the plurality of programmable units FPGA. Therefore, the wiring length of signal lines for coupling the processors CPU and the switch apparatus is longer than the wiring length of signal lines for coupling the processor CPU and the router unit RT in each server SV depicted in FIG. 1. The wiring length of a signal line for coupling the programmable unit FPGA and the switch apparatus is longer than the wiring length of a signal line that couples the programmable unit FPGA and the router unit RT in each server SV depicted in FIG. 1. Further, the transfer performance of information transferred between the processor CPU and the programmable unit FPGA coupled to each other through the switch apparatus is substantially the same independently of the processor CPU and the programmable unit FPGA that are used. Accordingly, the transfer performance of information transferred between a processor CPU and a programmable unit FPGA coupled to each other through the switch apparatus is lower than that in an alternative case in which software SW and an IP core IP are deployed in one server SV as depicted in FIG. 1.

Figure 2:
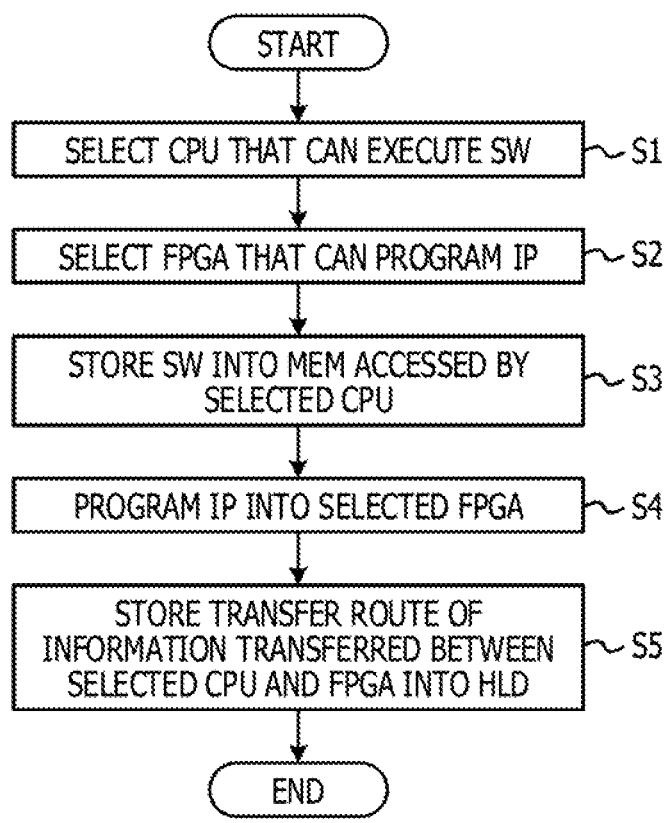
FIG. 2 is a flow chart illustrating an example of operation of a management server depicted in FIG. 1.

FIG. 2 illustrates an example of operation of the management server MSV depicted in FIG. 1. The operation illustrated in FIG. 2 is implemented by a control program executed by the management server MSV depicted in FIG. 1. FIG. 2 illustrates an example of a control method for the information processing system SYS1 and a control program for the information processing system SYS1.

First at step S1, the management server MSV selects a processor CPU that can execute new software SW from among the plurality of servers SV.

Then at step S2, the management server MSV selects a programmable unit FPGA that can program a new IP core IP from among the plurality of servers SV. Here, the programmable unit FPGA that programs a new IP core IP is preferably positioned proximately to the processor CPU that executes the corresponding software SW in order to assure a transfer performance. That is, preferably the number of router units RT interposed between the processor CPU that executes the software SW and the programmable unit FPGA that programs the new IP core IP is small. However, if the transfer performance of information transferred between the processor CPU and the programmable unit FPGA is sufficiently high with respect to the specifications of the software SW executed by the processor CPU, the position of the programmable unit FPGA that programs a new IP core IP is not limited.

Then at step S3, the management server MSV executes a storage process for storing the new software SW into the memory MEM accessed by the processor CPU selected at step S1 (namely, the memory MEM of the own node). Then at step S4, the management server MSV executes a program process for programming the new IP core IP in the programmable unit FPGA selected at step S2.

Then at step S5, the management server MSV executes a storage process for storing, into the retention unit HLD, route information representative of a transfer route of information transferred between the processor CPU that executes the new software SW and the programmable unit FPGA in which the new IP core IP is incorporated. In the example depicted in FIG. 1, each of the retention units HLD1 and HLD2 stores route information described below.

<Route Information Stored into Retention Unit HLD1>
(a) Information for the IP core IP1 received from the processor CPU1 that executes the software SW1 is transferred to the programmable unit FPGA1.
(b) Information for the IP core IP2 received from the processor CPU1 that executes the software SW2 is transferred to the router unit RT2.
(c) Information for the software SW1 received from the IP core IP1 of the programmable unit FPGA1 is transferred to the processor CPU1.
(d) Information for the software SW2 received from the router unit RT2 is transferred to the processor CPU1.

<Route Information Stored into Retention Unit HLD2>
(a) Information for the IP core IP2 received from the router unit RT1 is transferred to the programmable unit FPGA2.
(b) Information for the software SW2 received from the IP core IP2 of the programmable unit FPGA2 is transferred to the router unit RT1.

By executing the process illustrated in FIG. 2, it may be possible to efficiently deploy the software SW and the IP cores IP, and the performance of the information processing system SYS1 may be improved.

It is to be noted that, when an application APP (software SW and IP core IP) is managed by a different management apparatus, the management server MSV causes the different management apparatus to execute a storage process of the software SW, a program process of the IP core IP and a storage process of route information. In this case, the management server MSV controls the storage process of the software SW, the program process of the IP core IP and the storage process of route information.

As described above, in the embodiment depicted in FIGS. 1 and 2, a router unit RT is provided in each server SV and the router units RT are coupled to each other. By this configuration, software SW and IP cores IP may be deployed into a plurality of servers SV without degrading the processing performance of the software SW executed by the processor CPU. Further, by providing a router unit RT in each server SV and coupling the router units RT to each other, it may be possible to efficiently deploy software SW and IP cores IP dispersedly in a plurality of servers SV, and the performance of the information processing system SYS1 may be improved.

Figure 3:
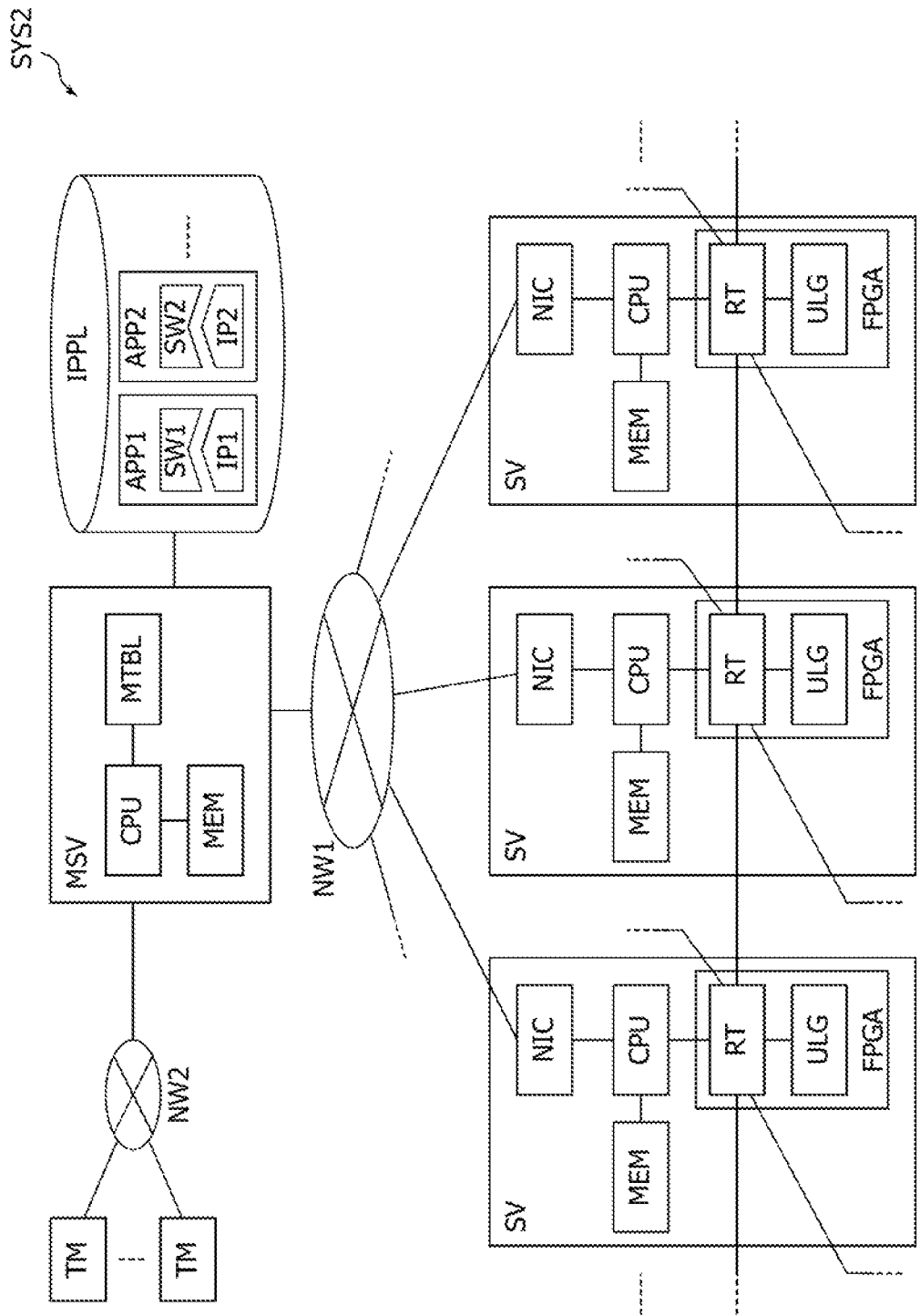
FIG. 3 is a block diagram depicting another embodiment of an information processing apparatus, an information processing system, a control method for an information processing system and a control program for an information processing system.

FIG. 3 depicts another embodiment of an information processing apparatus, an information processing system, a control method for an information processing system and a control program for an information processing system. Same or like elements to the elements described in connection with the embodiment depicted in FIG. 1 are denoted by the same reference symbols and detailed description of them is omitted herein.

An information processing system SYS2 depicted in FIG. 3 includes a plurality of servers SV, a management server MSV that manages the plurality of servers SV, and an IP pool IPPL managed by the management server MSV. Each server SV is coupled to the management server MSV through a network NW1 such as a local area network (LAN). The management server MSV is coupled to a plurality of terminal devices TM through a network NW2 such as the Internet or an intranet. For example, the information processing system SYS2 functions as a data center that provides a cloud service. It is to be noted that the management server MSV and the servers SV may be disposed at the same place or may be disposed at places spaced from each other.

The IP pool IPPL is constructed using a plurality of storage apparatus such as hard disk drives (HDDs) or solid state drives (SSDs) and retains a plurality of applications APP (APP1, APP2, . . . ). Each application APP includes software SW (SW1, SW2, . . . ) and circuit information of IP cores IP (IP1, IP2, . . . ). The IP pool IPPL is an example of a database that retains a plurality of applications APP each including software SW and circuit information of IP cores IP corresponding to individual pieces of the software SW.

Each piece (program) of the software SW is stored in the memory MEM of one of the plurality of servers SV and is executed by the processor CPU of the server SV. Each IP core IP includes circuit information for implementing a logical function of information processing such as data processing and is incorporated for re-construction in a user logic unit ULG in the programmable unit FPGA of one of the plurality of servers SV. The IP core IP incorporated in the programmable unit FPGA functions as a hardware accelerator and executes a given information process such as a data process based on an instruction from software SW executed by the processor CPU of the server SV. The user logic unit ULG is an example of a first programmable unit in which an IP core IP is programmed. In the following description, the processor CPU is referred to simply as CPU.

It is to be noted that the memory MEM includes, in addition to a storage area into which software SW is stored, another storage area into which process data used in a data process executed by the IP core IP is stored and a further storage area into which a process result generated by the IP core IP as a result of execution of the data process is stored. Further, the IP pool IPPL may be constructed in a storage apparatus such as an HDD incorporated in the management server MSV or may be coupled to the management server MSV through the network NW1 or the network NW2.

The management server MSV includes a CPU, a memory MEM and a management table MTBL. The CPU executes a control program retained in the memory MEM to deploy an application APP (APP1, APP2, . . . ) stored in the IP pool IPPL into one of the servers SV based on a request from a terminal device TM. That is, the management server MSV stores software SW into the memory MEM of the server SV based on the request from the terminal device TM and programs circuit information included in the IP core IP into the user logic unit ULG in the programmable unit FPGA. Further, the management server MSV receives information on data to be processed by the application APP or the like from the terminal device TM and transmits a process result processed by the application APP to the terminal device TM. Furthermore, the management server MSV has a function for registering the application APP into the IP pool IPPL and another function for managing the applications APP stored in the IP pool IPPL.

The management table MTBL retains, for each server SV, information indicative of a use situation of the CPU and information indicative of a use situation of the user logic unit ULG of the programmable unit FPGA. The information retained in the management table MTBL is updated every time an application APP is deployed into a server SV or every time an application APP is deleted from a server SV. It is to be noted that the management table MTBL may be retained in the memory MEM in the management server MSV. An example of the management table MTBL is illustrated in FIG. 9.

Each server SV includes a network interface card (NIC), a CPU, a memory MEM and a programmable unit FPGA. For example, the CPU, memory MEM and programmable unit FPGA individually have a form of a semiconductor chip and are mounted on a mother board or the like. The memory MEM may have a form of a memory module. The NIC is coupled to the network NW1 and couples the server SV to the management server MSV through the network NW1. Each server SV includes an HDD not depicted, and software SW transferred from the management server MSV is installed into the HDD, developed on the memory MEM and then made executable by the CPU.

The CPU controls operation of the entire server SV and executes the software SW stored in the memory MEM to control operation of the IP core IP incorporated in the user logic unit ULG of the programmable unit FPGA.

Figure 7:
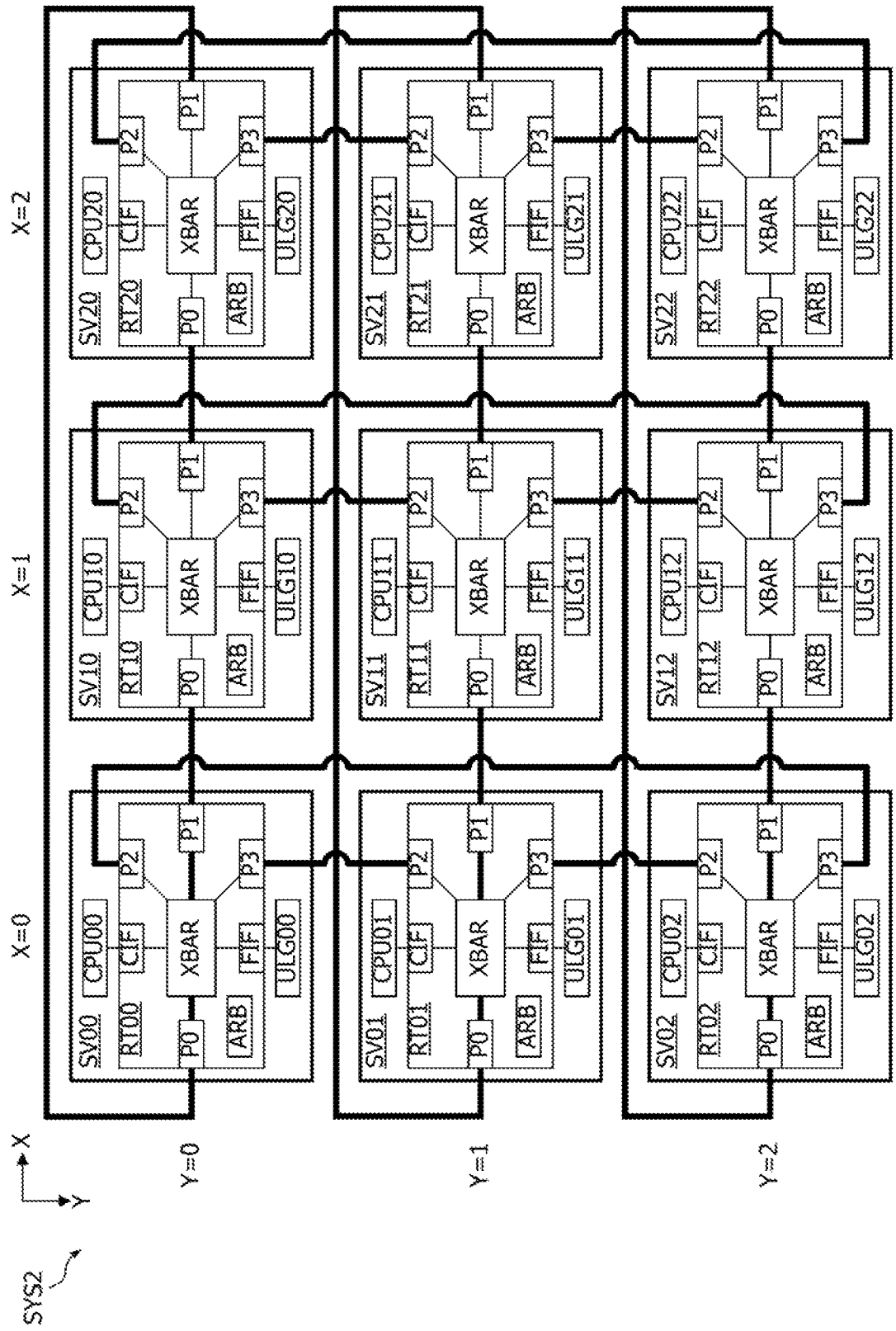
FIG. 7 is a block diagram depicting an example of coupling between servers by the router unit depicted in FIG. 5.

The programmable unit FPGA includes a router unit RT programmed in advance before the application APP is deployed into the server SV and a user logic unit ULG in which an IP core IP (circuit information) included in the application APP is incorporated. The user logic unit ULG is an example of a first programmable unit, and an area of the programmable unit FPGA in which the router unit RT is incorporated for re-construction is an example of a second programmable unit. The programmable unit FPGA is an example of a programmable apparatus including the router unit RT and the user logic unit ULG. For example, the servers SV (nodes) are coupled to each other through the router units RT by a second-order torus network. An example of coupling of the servers SV is depicted in FIG. 7.

The router unit RT in each server SV has a function of coupling the CPU of the server SV to one of the user logic units ULG of the plurality of servers SV. The router unit RT executes a routing process for transferring, based on a packet received from the CPU of the server SV, the packet to the user logic unit ULG of the destination. Further, the router unit RT executes a routing process for transferring, based on a packet received from the user logic unit ULG, the packet to the CPU of the server SV of the destination. Then, by the routing process, the CPU of each server SV and one of the user logic units ULG of the plurality of servers SV are coupled to each other for transfer of information.

By incorporating the router unit RT for re-construction in the programmable unit FPGA, transfer of information between the router unit RT and the user logic unit ULG may be executed within an FPGA chip. Consequently, in comparison with an alternative case in which a router unit RT and a user logic unit ULG are incorporated in semiconductor chips different from each other, transfer of information between the router unit RT and the user logic unit ULG may be executed at a high speed.

Each terminal device TM is a computer apparatus coupled to the network NW2 and instructs, when data processing or the like is executed using an application APP, the management server MSV to deploy the application APP to a server SV through the network NW2. For example, a user who uses a terminal device TM would first select an application APP that he/she wants to use from within a list of applications APP displayed on a display of the terminal device TM and then click an execution button or the like displayed on the display. The terminal device TM instructs, based on the fact that the execution button or the like is clicked, the management server MSV to deploy the application APP into a server SV through the network NW2.

Figure 4:
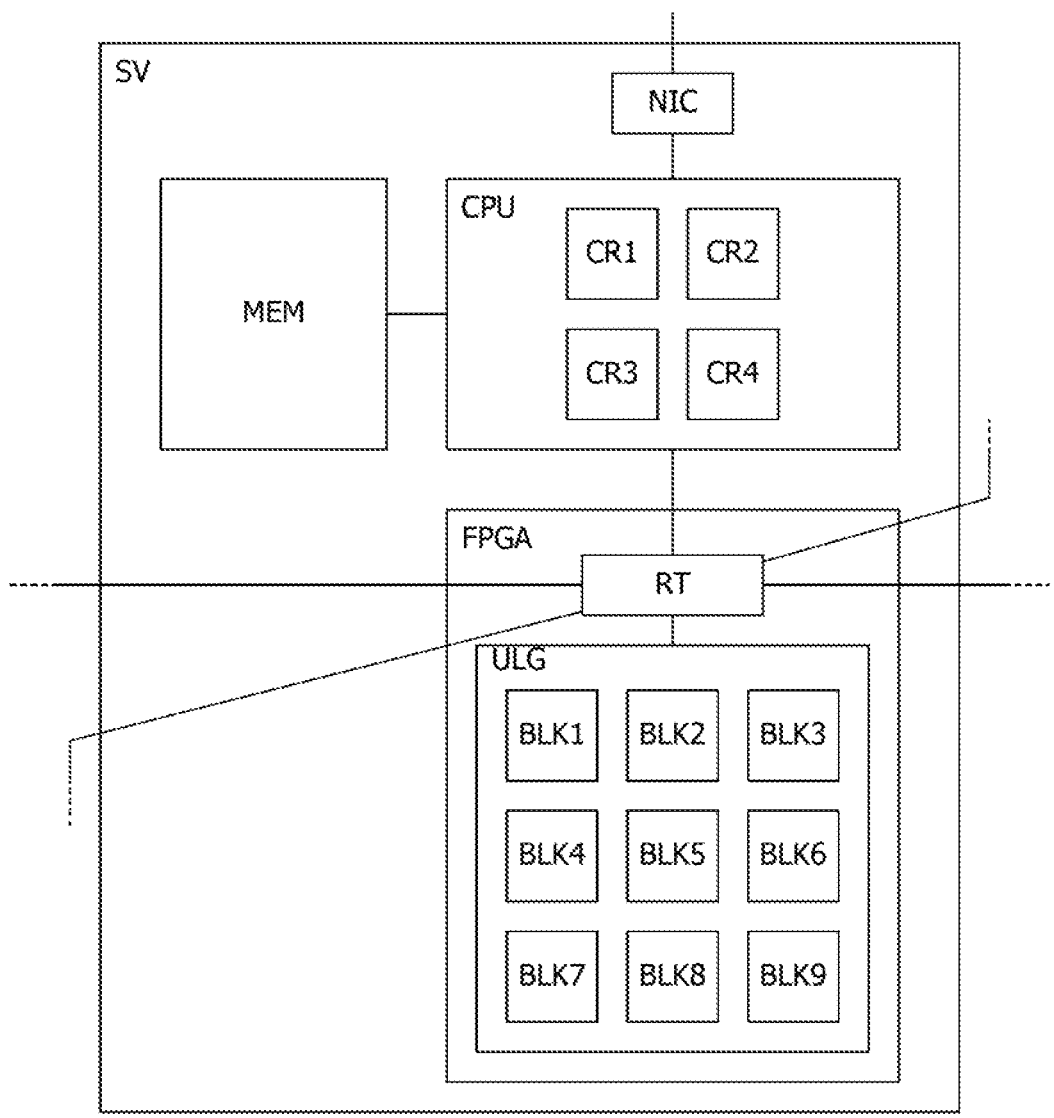
FIG. 4 is a block diagram depicting an example of a server depicted in FIG. 3.

FIG. 4 depicts an example of the server SV depicted in FIG. 3. In each server SV, the CPU includes four CPU cores CR (CR1 to CR4) that can individually execute software SW. The user logic unit ULG includes nine functional blocks BLK (BLK1 to BLK9) into which circuit information can be programmed. Each IP core IP is programmed at least into one functional block BLK. For example, IP cores IP different from each other are programmed into the functional blocks BLK. It is to be noted that the number of the CPU cores CR the CPU includes is not limited to four, and the number of the functional blocks BLK the user logic unit ULG includes is not limited to nine.

For example, each server SV may include four CPUs. In this case, each server SV includes 16 CPU cores CR and can execute up to 16 pieces of software SW. It is to be noted that, where a server SV executes 16 pieces of software SW greater than the number (nine) of the functional blocks BLK, an IP core IP corresponding to each piece of the software SW is deployed using the user logic unit ULG of the own node or the user logic unit ULG of a different node. Deployment of an IP core IP, which is controlled by software SW executed by the CPU of the own node, into the user logic unit ULG of a different node becomes possible by coupling of the router units RT of the servers SV to each other.

Figure 5:
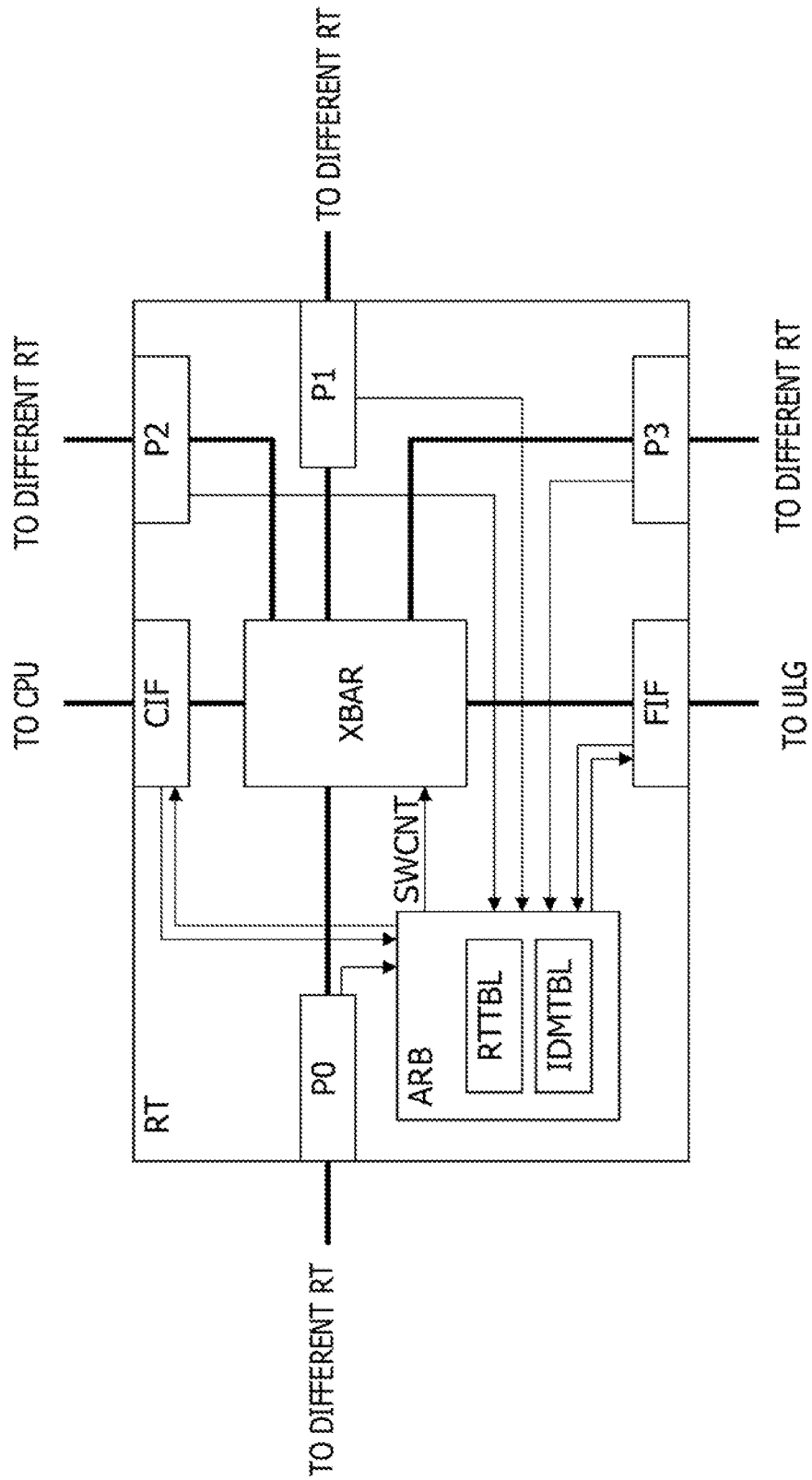
FIG. 5 is a block diagram depicting an example of a router unit depicted in FIG. 3.

FIG. 5 depicts an example of the router unit RT depicted in FIG. 3. The router unit RT includes an interface unit CIF coupled to the CPU, an interface unit FIF coupled to the user logic unit ULG, ports P (P0, P1, P2 and P3), a cross bar switch XBAR and an arbitration unit ARB. The arbitration unit ARB includes a routing table RTTBL and an ID mapping table IDMTBL.

The interface unit CIF refers to, when a packet is received from the CPU, the ID mapping table IDMTBL of the arbitration unit ARB and adds a destination ID indicative of a destination of the packet and a transmission source ID indicative of a transmission source of the packet to the packet received from the CPU. The interface unit CIF outputs the packet to which the destination ID and the transmission source ID are added to the cross bar switch XBAR. Further, when a packet is received from the cross bar switch XBAR, the interface unit CIF deletes the destination ID and the transmission source ID from the packet and outputs the packet from which the destination ID and the transmission source ID are deleted to the CPU.

The interface unit FIF refers to, when a packet is received from the user logic unit ULG, the ID mapping table IDMTBL of the arbitration unit ARB and adds a destination ID and a transmission source ID to the packet received from the user logic unit ULG. The interface unit FIF outputs the packet to which the destination ID and the transmission source ID are added to the cross bar switch XBAR. Further, when a packet is received from the cross bar switch XBAR, the interface unit FIF deletes the destination ID and the transmission source ID from the packet and outputs the packet from which the destination ID and the transmission source ID are deleted to the user logic unit ULG.

Each of the ports P0, P1, P2 and P3 outputs a packet received from the cross bar switch XBAR to the router unit RT of a different server SV and outputs a packet received from the router unit RT of a different server SV to the cross bar switch XBAR.

Figure 11:
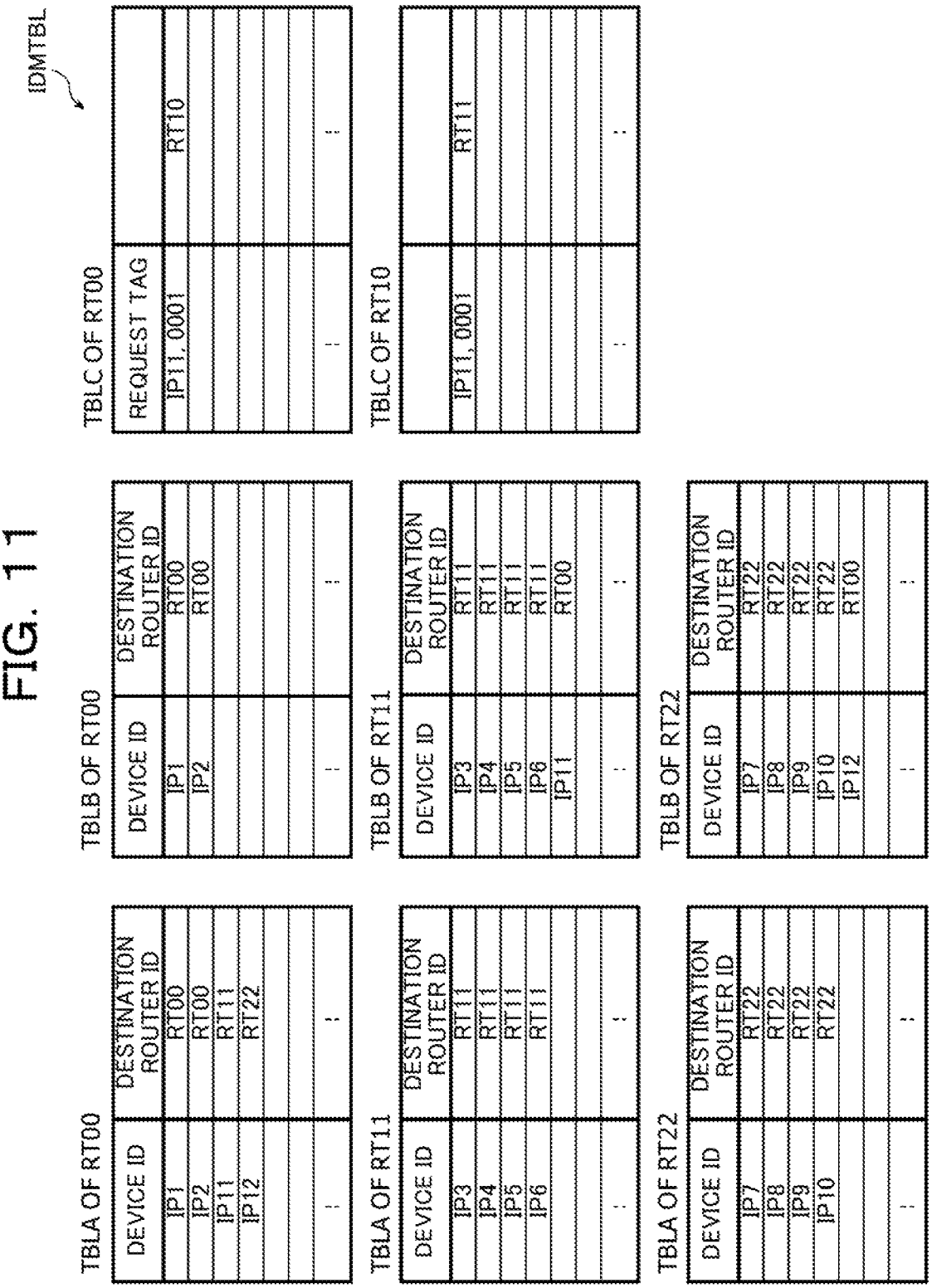
FIG. 11 is a view illustrating an example of an identification (ID) mapping table depicted in FIG. 5.

The arbitration unit ARB includes a routing table RTTBL indicative of a transfer route of information between router units RT and an ID mapping table IDMTBL indicative of a relationship between nodes in which software SW is incorporated and nodes in which IP cores IP are incorporated. An example of the routing table RTTBL is illustrated in FIG. 10, and an example of the ID mapping table IDMTBL is illustrated in FIG. 11.

The arbitration unit ARB refers to the routing table RTTBL based on a packet received from a different router unit RT by any of the ports P0, P1, P2 and P3 and determines a route along which the packet is transferred. Further, the arbitration unit ARB refers to the ID mapping table IDMTBL based on a packet received from the CPU by the interface unit CIF or a packet received from the user logic unit ULG by the interface unit FIF and determines a route along which the packet is transferred. The arbitration unit ARB generates a switch controlling signal SWCNT in accordance with the determined route and outputs the generated switch controlling signal SWCNT to the cross bar switch XBAR.

The cross bar switch XBAR is switched based on the switch controlling signal SWCNT and couples two of the interface unit CIF, interface unit FIF and ports P0, P1, P2 and P3 to each other. It is to be noted that, where transfer routes do not overlap with each other, the cross bar switch XBAR can transfer a plurality of packets in parallel.

Figure 6:
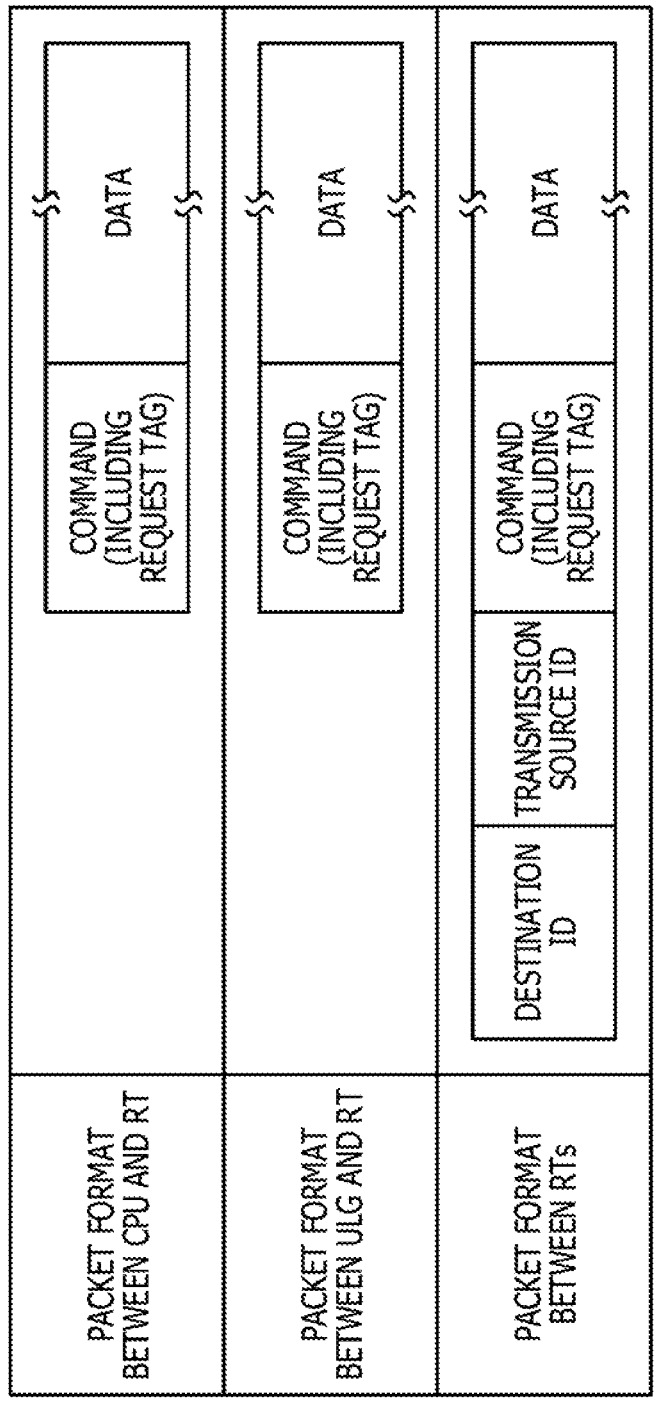
FIG. 6 is a view illustrating an example of a format of a packet transferred to the router unit depicted in FIG. 5.

FIG. 6 illustrates an example of a format of a packet transferred to the router unit RT depicted in FIG. 5. The packet transferred between the CPU and the router unit RT includes areas for individually storing a command and data indicative of contents of the packet. The command includes a request tag in which destination information indicative of a destination of the packet, a sequence number of the packet and so forth are stored. A packet transferred between the user logic unit ULG and the router unit RT is similar to a packet transferred between the CPU and the router unit RT and includes areas into which a command and data indicative of contents of the packet are stored individually.

A packet transferred between router units RT includes areas for individually storing a destination ID, a transmission source ID, a command and data. The destination ID and the transmission source ID include information for identifying a CPU or a user logic unit ULG (namely, a programmable unit FPGA). As described hereinabove with reference to FIG. 5, the destination ID and the transmission source ID are added by the interface unit CIF that has received the packet from the CPU or by the interface unit FIF that has received the packet from the user logic unit ULG.

For example, when the CPU instructs the IP core IP to start data processing or when the CPU returns a response to a memory access request issued by the IP core IP to the IP core IP, the CPU issues a packet to the IP core IP. When the IP core IP executes reading out of data or writing of data from or into the memory MEM in which the software SW is stored, the IP core IP issues a packet of a memory access request to the CPU.

For example, the packet for instructing the IP core IP to start data processing is a packet for writing a given value into a configuration register provided in the IP core IP. In order to read out process data, which is data of a processing target, from the memory MEM based on the fact that the given value is written into the configuration register, the IP core IP issues a packet for a memory access request (reading out request packet) to the CPU.

The CPU includes a system controller that can control access to the memory MEM without the intervention of the CPU core CR (software SW). When the reading out request packet is received from the IP core IP, the system controller accesses the memory MEM and issues a response packet including the process data read out from the memory MEM to the IP core IP. It is to be noted that the process data is stored into the memory MEM before an instruction to start data processing is issued by the CPU core CR that executes the software SW.

The IP core IP receiving the packet including the process data executes a data process and issues a packet of a memory access request (write request packet) to the CPU in order to write a process result to the memory MEM. The write request packet includes the process result. The system controller of the CPU receiving the write request packet from the IP core IP accesses the memory MEM and writes the process result received from the IP core IP into the memory MEM. Then, after the writing of the process result into the memory MEM is completed, the system controller issues a response packet to the write request packet to the IP core IP.

FIG. 7 depicts an example of coupling between servers SV by the router unit RT depicted in FIG. 5. In FIG. 7, a thick line indicates a coupling route between servers SV coupled to each other through the ports P. In the example depicted in FIG. 7, the information processing system SYS2 includes nine servers SV arrayed by three in an X direction and by three in a Y direction. The servers SV are coupled to each other by two-dimensional torus coupling. Of two digits added to the tail of the reference symbol of each of the servers SV, CPUs, router units RT and user logic units ULG, the upper digit indicates an order number (address) in the X direction and the lower digit indicates an order number in the Y direction.

Although the number of nodes in the example depicted in FIG. 7 is nine, the number of nodes is not limited to nine. Further, although FIG. 7 depicts an example of two-divisional torus coupling, the nodes may be coupled by mesh coupling or may be coupled by torus coupling or mesh coupling of more than three dimensions.

Figure 8:
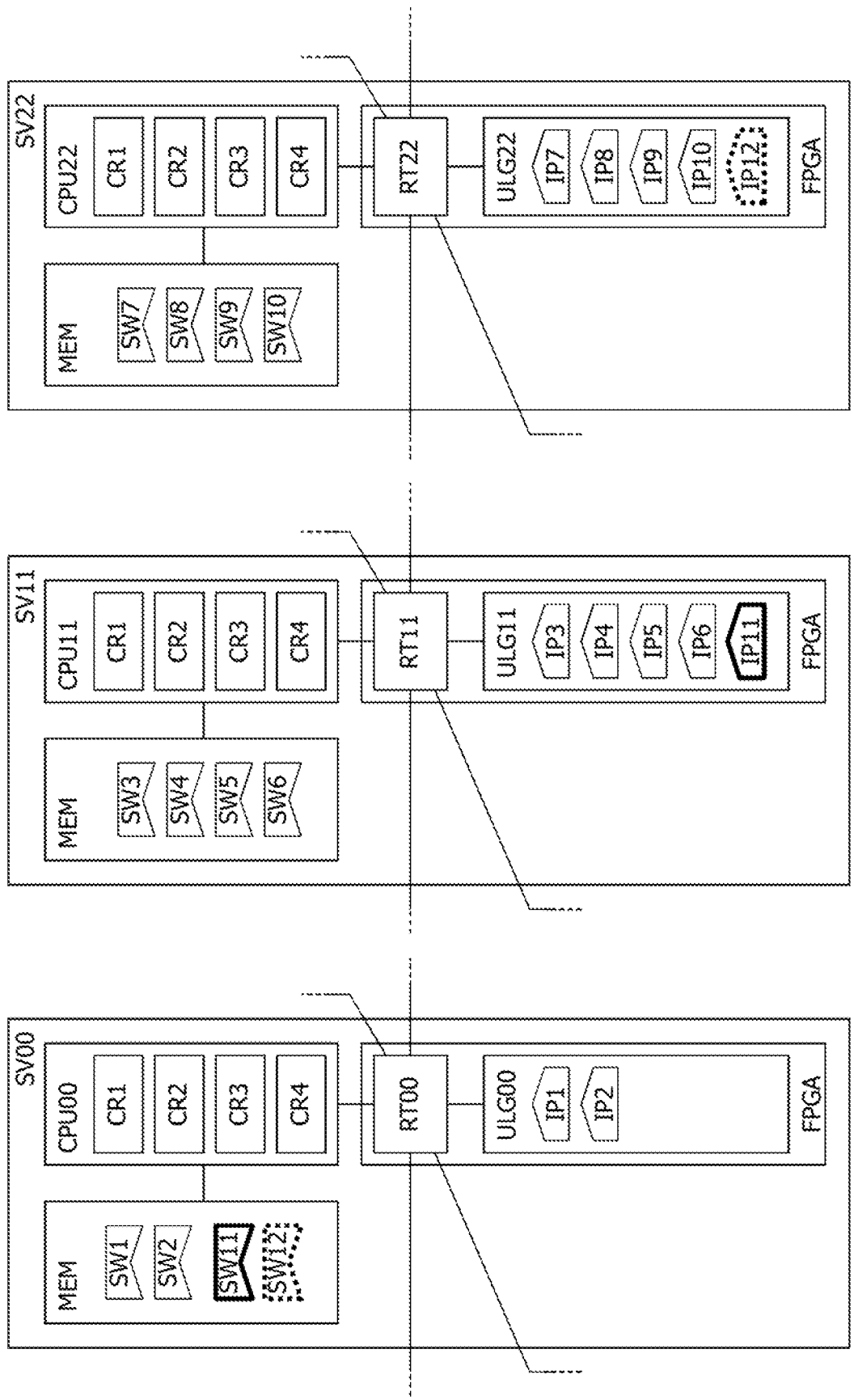
FIG. 8 is a view illustrating an example of applications deployed in the servers depicted in FIG. 3.

FIG. 8 illustrates an example of applications APP deployed in the servers SV depicted in FIG. 3. In FIG. 8, three servers SV00, SV11 and SV22 from among the servers SV depicted in FIG. 7 are depicted in order to facilitate understandings. One of pieces of the software SW and one of the IP cores IP which are paired with each other by a same tail digit in the reference symbols correspond to one application APP. Each of the CPU cores CR1 to CR4 can execute one of the pieces of the software SW. Therefore, in each server SV, the maximum number of pieces of software SW stored into the memory MEM is "four." It is to be noted that each of the CPU cores CR1 to CR4 may activate a plurality of virtual machines such that each virtual machine executes the software SW. In this case, the maximum number of pieces of the software SW stored into the memory MEM is equal to the number of virtual machines activated in the CPU. Accordingly, the number of executable pieces of software SW may be increased in comparison with an alternative case in which no virtual machine is used.

In the server SV00, software SW1, SW2, SW11 and SW12 is stored in the memory MEM, and IP cores IP1 and IP2 are programmed in a user logic unit ULG00. In the server SV11, software SW3, SW4, SW5 and SW6 is stored in the memory MEM, and IP cores IP3, IP4, IP5, IP6 and IP11 are programmed in a user logic unit ULG11. In the server SV22, software SW7, SW8, SW9 and SW10 is stored in the memory MEM, and IP cores IP7, IP8, IP9, IP10 and IP12 are programmed in a user logic unit ULG22.

The software SW11 and IP core IP11 indicated by thick solid lines and the software SW12 and IP core IP12 indicated by thick broken lines indicate that they are deployed across two servers SV. For example, the memory MEM and the user logic unit ULG in which the applications APP1 to APP10 are deployed are included in one server SV. The memory MEM and the user logic unit ULG in which the applications APP11 and APP12 are deployed are included in servers SV different from each other.

By coupling a CPU and a user logic unit ULG to each other by a router unit RT, software SW and an IP core IP of each application APP may be deployed in an arbitrary memory MEM and an arbitrary user logic unit ULG. Further, by coupling a CPU and a user logic unit ULG to each other by a router unit RT provided in each server SV, routing of a packet may be executed in each server SV. Consequently, in comparison with an alternative case in which a CPU and a user logic unit ULG are coupled to each other by a router apparatus, a switch apparatus or the like provided outside a server SV, the transfer speed of a packet (transfer amount of packets transferred within a given period of time) may be improved. As a result, the performance of the information processing system SYS2 may be improved. It is to be noted that preferably the number of router units RT interposed between a CPU core CR that executes software SW and a user logic unit ULG in which an IP core IP is incorporated is small in order to suppress degradation of the transfer speed of packets.

Furthermore, although the software SW11 and the IP core IP11 in FIG. 8 are deployed across the servers SV00 and SV11, the deployment is equivalent to that in a case in which the software SW11 and the IP core IP11 are deployed only in the server SV00 except that the number of router units RT interposed therebetween is different. Accordingly, in the information processing system SYS2 depicted in FIG. 3, an existing application APP (SW and IP) may be used as it is to provide a cloud service.

FIG. 9 illustrates an example of the management table MTBL in the management server MSV depicted in FIG. 3. The management table MTBL includes, for each CPU core CR in each server SV, a flag area FLG for storing information indicative of use/non-use of the CPU core CR and an SW name area for storing information indicative of the name of software SW to be operated. Further, the management table MTBL includes, for each functional block BLK in each server SV, a flag area FLG for storing information indicative of use/non-use of the functional block BLK and an IP name area for storing information indicative of the name of an IP core IP to be operated. The value "0" stored in each flag area FLG indicates "non-use" while the value "1" stored in each flag area FLG indicates "use." The management table MTBL is updated by the management server MSV every time software SW and an IP core IP are deployed into a server SV. The management table MTBL is an example of a situation retention unit that retains information indicative of a use situation of the CPU cores CR of each server SV and information indicative of a use situation of the functional blocks BLK of each server SV. It is to be noted that the CPU is sometimes exchanged in any server SV and the number of CPU cores CR sometimes changes. Alternatively, the programmable unit FPGA is sometimes exchanged in any server SV and the number of functional blocks BLK in the user logic unit ULG sometimes changes. Also in such cases, practical use of the information processing system SYS2 may be continued by changing the management table MTBL.

The example illustrated in FIG. 9 indicates that the CPU cores CR3 and CR4 of the server SV00, the functional block BLK9 of the server SV00, the functional block BLK9 of the server SV10 and the CPU core CR4 of the server SV20 are not used as yet. Further, it is indicated that the functional blocks BLK6 to BLK9 of the server SV11, the functional block BLK9 of the sever SV21 and the functional blocks BLK7 to BLK9 of the server SV22 are not used as yet. The state of the management table MTBL illustrated in FIG. 9 corresponds to a deployment state of applications APP illustrated in FIG. 12 hereinafter described. For example, the management table MTBL illustrated in FIG. 9 indicates a state before the application APP11 (SW11 and IP11) and the application APP12 (SW12 and IP12) are deployed into the information processing system SYS2 in FIG. 8. It is to be noted that, also when a server SV is additionally provided or is removed, practical use of the information processing system SYS2 may be continued by changing the management table MTBL and the routing table RTTBL in accordance with the server SV additionally provided or removed.

FIG. 10 illustrates an example of the routing table RTTBL depicted in FIG. 5. The routing table RTTBL of each router unit RT includes an area for storing information indicative of a number P# of a port P from which a received packet is outputted for each destination ID included in the packet. The routing table RTTBL illustrated in FIG. 10 is set based on transfer specifications of a packet between servers SV by the management server MSV upon starting of the information processing system SYS2. For example, in one example of transfer specifications of a packet between servers SV, a packet is first transferred in the Y direction (vertical direction) of FIG. 7 and then transferred in the X direction (horizontal direction) of FIG. 7.

For example, when the CPU00 that executes the software SW11 stored in the memory MEM of the server SV00 transmits a packet to the IP core IP11 incorporated in the user logic unit ULG11 of the server SV11 in FIG. 8, the destination ID is RT11. Therefore, the router unit RT00 receiving a packet from the CPU00 first refers to the routing table RTTBL and transfers the packet to the port P3 corresponding to the destination ID=RT11, and the packet comes to the router unit RT01. The router unit RT01 refers to the routing table RTTBL and transfers the packet to the port P1 corresponding to the destination ID=RT11, and the packet comes to the router unit RT11. The router unit RT11 transfers, since the destination ID included in the packet indicates the router unit RT11 itself, the packet to the user logic unit ULG11 based on the information indicative of the IP core IP11 included in the command (request tag) in the packet.

In the meantime, when the IP core IP11 incorporated in the user logic unit ULG11 of the server SV11 transmits a packet to the CPU00 that executes the software SW11 installed in the memory MEM of the server SV00, the destination ID is RT00. Therefore, the router unit RT11 first refers to the routing table RTTBL and transfers the packet to the port P2 corresponding to the destination ID=RT00, and the packet comes to the router unit RT10. The router unit RT10 refers to the routing table RTTBL and transfers the packet to the port P0 corresponding to the destination ID=RT00, and the packet comes to the router unit RT00. The router unit RT00 transfers, since the destination ID included in the packet indicates the router unit RT00 itself, the packet to the CPU00 based on the information indicative of the software SW11 included in the command (request tag) in the packet.

FIG. 11 illustrates an example of the ID mapping table IDMTBL illustrated in FIG. 5. The ID mapping table IDMTBL of each router unit RT includes a correspondence table TBLA, TBLB and/or TBLC. The ID mapping table IDMTBL is an example of a retention unit configured to retain route information indicative of a transfer route of information that is transferred between the CPU and the user logic unit ULG of the own node or a different node in which the IP core IP is programmed.

The correspondence table TBLA of each router unit RT retains information indicative of an incorporation destination of an IP core IP corresponding to software SW incorporated in each node. For example, the correspondence table TBLA includes an area for storing a device ID indicative of the IP core IP incorporated in the user logic unit ULG and an area for storing a destination router ID indicative of a router unit RT coupled to the user logic unit ULG in which the IP core IP is incorporated.

The correspondence table TBLA is used when the interface unit CIF of the router unit RT that has received a packet, which instructs an IP core IP to start data processing, from the CPU determines a destination ID (FIG. 6) to be added to the packet. The correspondence table TBLA is updated by the management server MSV every time software SW and an IP core IP are deployed into servers SV different from each other.

For example, the correspondence table TBLA of the router unit RT00 indicates that the IP cores IP1 and IP2 are incorporated in the user logic unit ULG of the own node (SV00). Meanwhile, the correspondence table TBLA of the router unit RT00 indicates that the IP core IP11 is incorporated in the user logic unit ULG of a different node (SV11) and the IP core IP12 is incorporated in the user logic unit ULG of another different node (SV22).

The correspondence table TBLB of each router unit RT retains information indicative of an incorporation destination of software SW corresponding to the IP core IP incorporated in each node. For example, the correspondence table TBLB includes an area for storing a device ID indicative of an IP core IP incorporated in the user logic unit ULG and another area for storing a destination router ID indicative of a router unit RT coupled to the CPU that executes software SW corresponding to the IP core IP.

The correspondence table TBLB is used when the interface unit FIF of the router unit RT that has received a packet of a memory access request from the IP core IP determines a destination ID (FIG. 6) to be added to the packet. The correspondence table TBLB is updated by the management server MSV every time software SW and an IP core IP are deployed into servers SV different from each other.

For example, the correspondence table TBLB of the router unit RT11 indicates that software SW corresponding to the IP cores IP3, IP4, IP5 and IP6 is incorporated in the own node (SV11). Meanwhile, the correspondence table TBLB of the router unit RT11 indicates that software SW corresponding to the IP core IP11 is incorporated in a different node (SV00).

The correspondence table TBLC of each router unit RT retains information indicative of a transfer route of a response packet to a packet of a memory access request issued from the IP core IP. For example, the correspondence table TBLC includes an area for storing a request tag included in a packet of a memory access request and another area for storing a transmission source router ID indicative of the most proximate router unit RT from which the packet of a memory access request is transferred to the router unit RT.

The correspondence table TBLC is used when a response packet to a packet of a memory access request is transferred to an IP core IP from which the memory access request has been issued. The correspondence table TBLC is updated by the arbitration unit ARB of each router unit RT every time each router unit RT receives a packet of a memory access request.

For example, it is assumed that a packet of a memory access request issued from the IP core IP11 is received by the router unit RT10. In this case, the router unit RT10 stores a request tag included in the packet and a transmission source router ID indicative of the router unit RT11 of the most proximate transmission source of the packet into the correspondence table TBLC. Into the area for a request tag of the correspondence table TBLC, information indicative of the IP core IP11 from which the packet of a memory access request has been issued, and a sequence number of the packet (in the example, "0001") are stored.

The router unit RT10 transfers the packet of a memory access request to the router unit RT00 in accordance with the routing table RTTBL. The router unit RT00 receiving the packet of a memory access request from the router unit RT10 stores the request tag included in the packet and the transmission source router ID indicative of the router unit RT10 of the most proximate transmission source of the packet into the correspondence table TBLC. The router unit RT00 transfers, since the destination ID included in the packet of a memory access request indicates the router unit RT00 itself, the packet to the CPU00 based on the information indicative of the software SW11 included in the command (request tag) in the packet.

On the other hand, the router unit RT00 receiving a response packet to the packet of a memory access request from the CPU00 refers to the correspondence table TBLC. Here, the arbitration unit ARB of the router unit RT00 detects that the packet is a response packet by decoding the command in the packet. The router unit RT00 transfers the response packet to the router unit RT10 indicated by the transmission source router ID stored in the correspondence table TBLC corresponding to a request tag coincident with the request tag included in the command in the response packet.

The router unit RT10 receiving the response packet to the packet of a memory access request from the router unit RT00 operates similarly to the router unit RT00 described hereinabove, refers to the correspondence table TBLC, and transfers the response packet to the router unit RT11. Then, the response packet is transferred to the IP core IP11 of the issuance source of the packet of a memory access request through the router unit RT11.

By providing the ID mapping table IDMTBL in each router unit RT, information may be transferred with certainty between the CPU core CR that executes the software SW and the IP core IP. For example, also where an IP core IP corresponding to software SW is deployed into the user logic unit ULG of the own node or a different node, information may be transferred with certainty between the CPU core CR that executes the software SW and the IP core IP.

Figure 12:
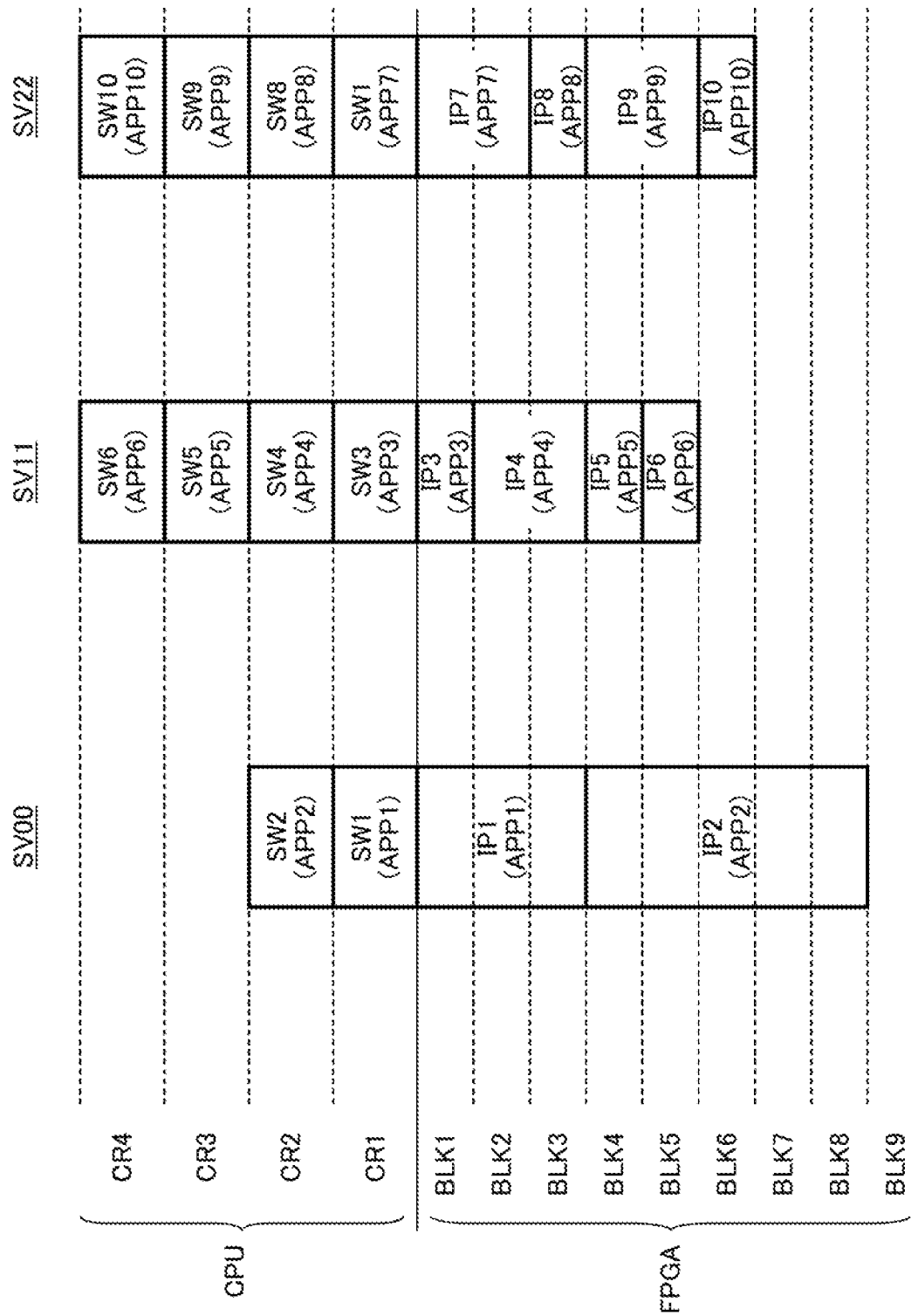
FIG. 12 is a view illustrating an example of a state in which applications are deployed in the information processing system depicted in FIG. 3.

FIG. 12 illustrates an example of a state in which applications APP are deployed in the information processing system SYS2 depicted in FIG. 3. In FIG. 12, in order to facilitate understandings, only the three servers SV00, SV11 and SV22 from among the servers SV depicted in FIG. 7 are depicted. FIG. 12 visually illustrates a state of the management table MTBL illustrated in FIG. 9. For example, FIG. 12 represents that the CPU cores CR3 and CR4 of the server SV00, the functional block BLK9 of the server SV00, the functional blocks BLK6 to BLK9 of the server SV11 and the functional blocks BLK7 to BLK9 of the server SV22 are not used.

In the example illustrated in FIG. 12, software SW is assigned for each CPU core CR, and an IP core IP is assigned to one or a plurality of functional blocks BLK in response to a circuit scale. By assigning the software SW for each CPU core CR, it may be possible to manage deployment of applications APP by the management server MSV using the management table MTBL that is simple and easy.

Software SW of an application APP deployed newly may be assigned to one of the CPU cores CR3 and CR4 of the server SV00. The IP core IP of the application APP deployed newly may be assigned to one of the functional block BLK9 of the server SV00, the functional blocks BLK6 to BLK9 of the server SV11 and the functional blocks BLK7 to BLK9 of the server SV22.

On the other hand, where each server SV does not include a router unit RT, an application APP may be deployed only into the CPU core CR3 or CR4 and the functional block BLK9 of the server SV00. For example, the IP core IP may not be incorporated in the functional blocks BLK6 to BLK9 that are free in the server SV11 and in the functional blocks BLK7 to BLK9 that are free in the server SV22, and wasteful areas may appear in the user logic unit ULG. Further, where an IP core IP deployed newly is incorporated across a plurality of functional blocks BLK, the information processing system SYS2 may not deploy the application APP despite the fact that the CPU cores CR3 and CR4 of the server SV00 are free.

It is to be noted that the IP core IP5 or the like that can be incorporated into one functional block BLK sometimes executes data processing, which is simple and easy in comparison with the other IP cores IP, repetitively and sometimes receives an instruction for data processing frequently from the software SW5. Also in this case, by coupling the CPU core CR that executes the software SW5 and the IP core IP5 through the router units RT in the servers SV, degradation of the processing performance of the software SW5 may be suppressed in comparison with an alternative case in which a switch apparatus outside the servers SV is interposed.

Figure 13:
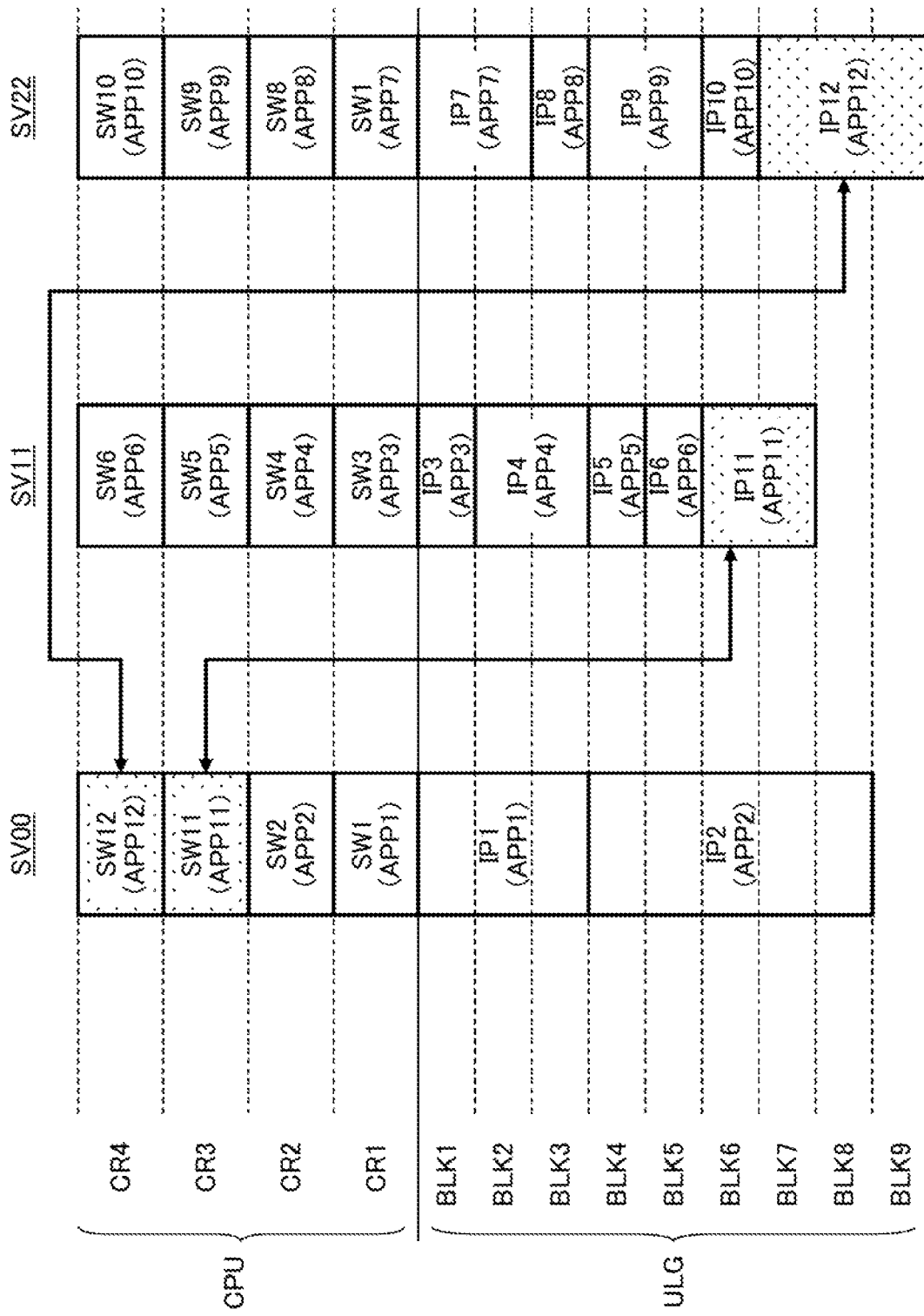
FIG. 13 is a view illustrating another example of a state in which applications are deployed in the information processing system depicted in FIG. 3.

FIG. 13 illustrates another example of a state in which applications APP are deployed in the information processing system SYS2 depicted in FIG. 3. Detailed description of the same elements as those in FIG. 12 is omitted herein. FIG. 13 corresponds to the state illustrated in FIG. 8. For example, FIG. 13 illustrates a state in which applications APP11

(SW11 and IP11) and APP12 (SW12 and IP12) indicated by dots are deployed newly from the state illustrated in FIG. 12.

In FIG. 13, two functional blocks BLK are used for incorporation of the IP core IP11, and three functional blocks BLK are used for incorporation of the IP core IP12. Therefore, the IP cores IP11 and IP12 are respectively incorporated into the servers SV11 and SV12 that are different from the server SV00, in which servers SV11 and SV12 the software SW11 and SW12 is incorporated. That is, since the servers SV include the router units RT coupled to each other, the software SW and the IP cores IP may be incorporated into servers SV different from each other.

Figure 14:
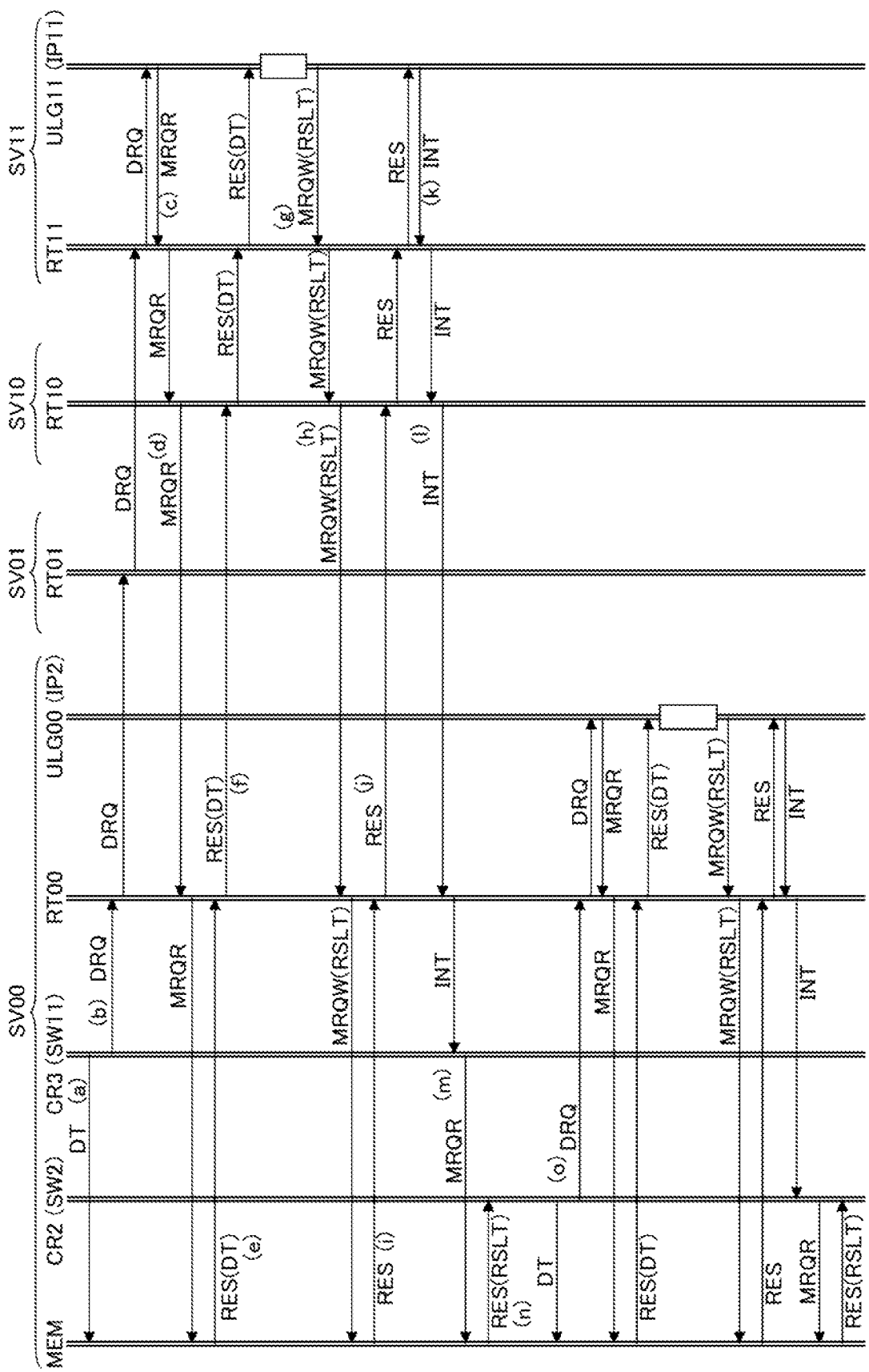
FIG. 14 is a view illustrating an example of operation of applications executed by the servers depicted in FIG. 3.

FIG. 14 illustrates an example of operation of applications APP executed by the servers SV depicted in FIG. 3. In FIG. 14, the application APP11 (SW11 and IP11) and the application APP2 (SW2 and IP2) illustrated in FIG. 13 are executed. It is to be noted that, in the operation illustrated in FIG. 14, in order to facilitate understandings, the applications APP11 (SW11 and IP11) and APP2 (SW2 and IP2) are executed in order without overlapping with each other. However, the applications APP11 and APP2 may be executed in an overlapping relationship with each other.

First, the software SW11 executed by the CPU core CR3 of the server SV00 writes process data DT to be processed by the IP core IP11 of the server SV11 into the memory MEM ((a) of FIG. 14). It is to be noted that, in actual operation, the CPU core CR3 issues a memory access request MRQW for writing the process data DT into the memory MEM to the memory MEM. The memory MEM writes the process data DT into a storage area and then issues a response packet RES to the memory access request MRQW.

After the process data DT is written into the memory MEM, the software SW11 issues a data process request DRQ (packet) to the IP core IP11 ((b) of FIG. 14). The data process request DRQ is transferred to the IP core IP11 through the router units RT00, RT01 and RT11 in accordance with the routing table RTTBL illustrated in FIG. 10. The data process request DRQ is an example of an instruction for data processing transferred from the CPU core CR3 to the IP core IP11.

The IP core IP11 receiving the data process request DRQ issues a memory access request MRQR (packet) for reading out the process data DT from the memory MEM ((c) of FIG. 14). The memory access request MRQR is transferred to the memory MEM through the router units RT11, RT10 and RT00 in accordance with the routing table RTTBL ((d) of FIG. 14). The memory access request MRQR is an example of a reading out request of process data transferred from the IP core IP11 to the memory MEM. It is to be noted that, in actual operation, readout access to the memory MEM is executed through the system controller incorporated in the CPU (FIG. 4).

The system controller that controls access to the memory MEM issues a response packet RES including the process data DT read out from the storage area based on the memory access request MRQR ((e) of FIG. 14). The response packet RES including the process data DT is transferred to the IP core IP11 through the router units RT00, RT10 and RT11 in accordance with the correspondence table TBLC of the ID mapping table IDMTBL illustrated in FIG. 11 ((f) of FIG. 14). For example, the response packet RES including the process data DT is transferred along a route reversed to the route along which the memory access request MRQR has been transferred.

The IP core IP11 executes data processing using the process data DT transferred from the memory MEM and issues a memory access request MRQW (packet) for writing a process result RSLT obtained by the data processing into the memory MEM ((g) of FIG. 14). The process result RSLT is transferred to the memory MEM through the router units RT11, RT10 and RT00 in accordance with the routing table RTTBL and is written into the storage area of the memory MEM ((h) of FIG. 14). The memory access request MRQW is an example of a write request of a process result issued to the memory MEM from the IP core IP11.

The system controller incorporated in the CPU of the server SV00 issues a response packet RES to the memory access request MRQW in response to completion of writing of the process result RSLT into the memory MEM ((i) of FIG. 14). The response packet RES is transferred to the IP core IP11 through the router units RT00, RT10 and RT11 in accordance with the correspondence table TBLC of the ID mapping table IDMTBL ((j) of FIG. 14).

The IP core IP11 receiving the response packet RES issues an interrupt INT (packet) for notifying the software SW11 executed by the CPU core CR1 of the completion of the data processing ((k) of FIG. 14). The interrupt INT is transferred to the CPU core CR3 through the router units RT11, RT10 and RT00 in accordance with the routing table RTTBL ((l) of FIG. 14).

The software SW11 that has detected the interrupt INT issues a memory access request MRQR for reading out the process result RSLT from the memory MEM ((m) of FIG. 14). Then, the software SW11 receives the process result RSLT from the memory MEM, and completes one of the processes of the application APP11 ((n) of FIG. 14).

Next, the software SW2 executed by the CPU core CR2 of the server SV00 writes the process data DT to be processed by the IP core IP2 of the server SV00 into the memory MEM and then issues a data process request DRQ (packet) to the IP core IP2 ((o) of FIG. 14). Later operation of the software SW2 executed by the CPU core CR2 and the IP core IP2 is similar to the operation described hereinabove of the software SW11 executed by the CPU core CR3 and the IP core IP11 except that the packet is transferred only through the router unit RT00. As illustrated in FIG. 14, also where an IP core IP corresponding to software SW is deployed into the user logic unit ULG of a different node, information may be transferred with certainty between the CPU core CR that executes the software SW and the IP core IP through the router units RT.

Figure 15:
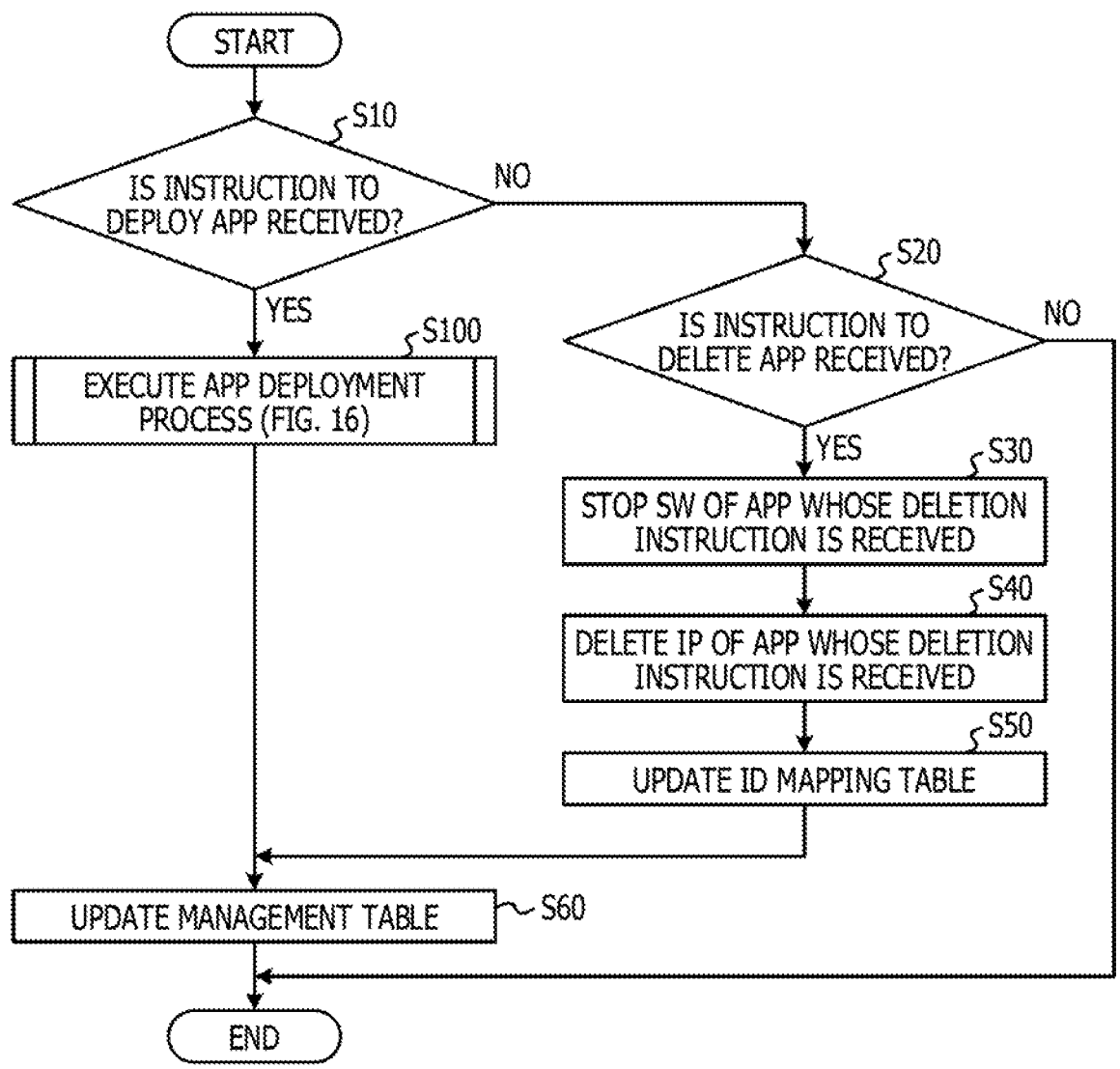
FIG. 15 is a flow chart illustrating an example of operation of the management server depicted in FIG. 3.

FIG. 15 illustrates an example of operation of the management server MSV depicted in FIG. 3. The operation illustrated in FIG. 15 is implemented by a control program executed by the management server MSV depicted in FIG. 3. FIG. 15 illustrates an example of a control method for the information processing system SYS2 and a control program for the information processing system SYS2.

First at step S10, the management server MSV determines whether or not an instruction for deployment of an application APP is received from a terminal device TM through the network NW2. If an instruction for deployment of an application APP is received, the processing advances to step S100. If an instruction for deployment of an application APP is not received, the processing advances to step S20.

At step S20, the management server MSV determines whether or not an instruction for deletion of an application APP is received from a terminal device TM through the network NW2. If an instruction for deletion of an application APP is received, the processing advances to step S30. If an instruction for deletion of an application APP is not received, the processing is ended.

At step S30, the management server MSV refers to the management table MTBL to detect a CPU core CR of a server SV in which software SW of the application APP whose deletion instruction has been received operates. Then, the management server MSV stops the software SW of the application APP that operates on the detected CPU core CR.

Then at step S40, the management server MSV refers to the management table MTBL to detect a functional block BLK of a server SV in which the IP core IP of the application APP whose deletion instruction has been received is incorporated. Then, the management server MSV deletes the IP core IP from the detected functional block BLK.

Then at step S50, the management server MSV updates the correspondence tables TBLA and TBLB of the ID mapping table IDMTBL illustrated in FIG. 11 based on the deleted application APP (SW and IP), whereafter the processing advances to step S60.

On the other hand, if an instruction for deployment of an application APP is received, at step S100, the management server MSV executes a process for deploying the application APP, whereafter the processing is advanced to step S60. An example of the process at step S100 is illustrated in FIG. 16.

At step S60, the management server MSV updates the management table MTBL illustrated in FIG. 9 in response to the deployment of the application APP or the deletion of the application APP, and ends the processing.

Figure 16:
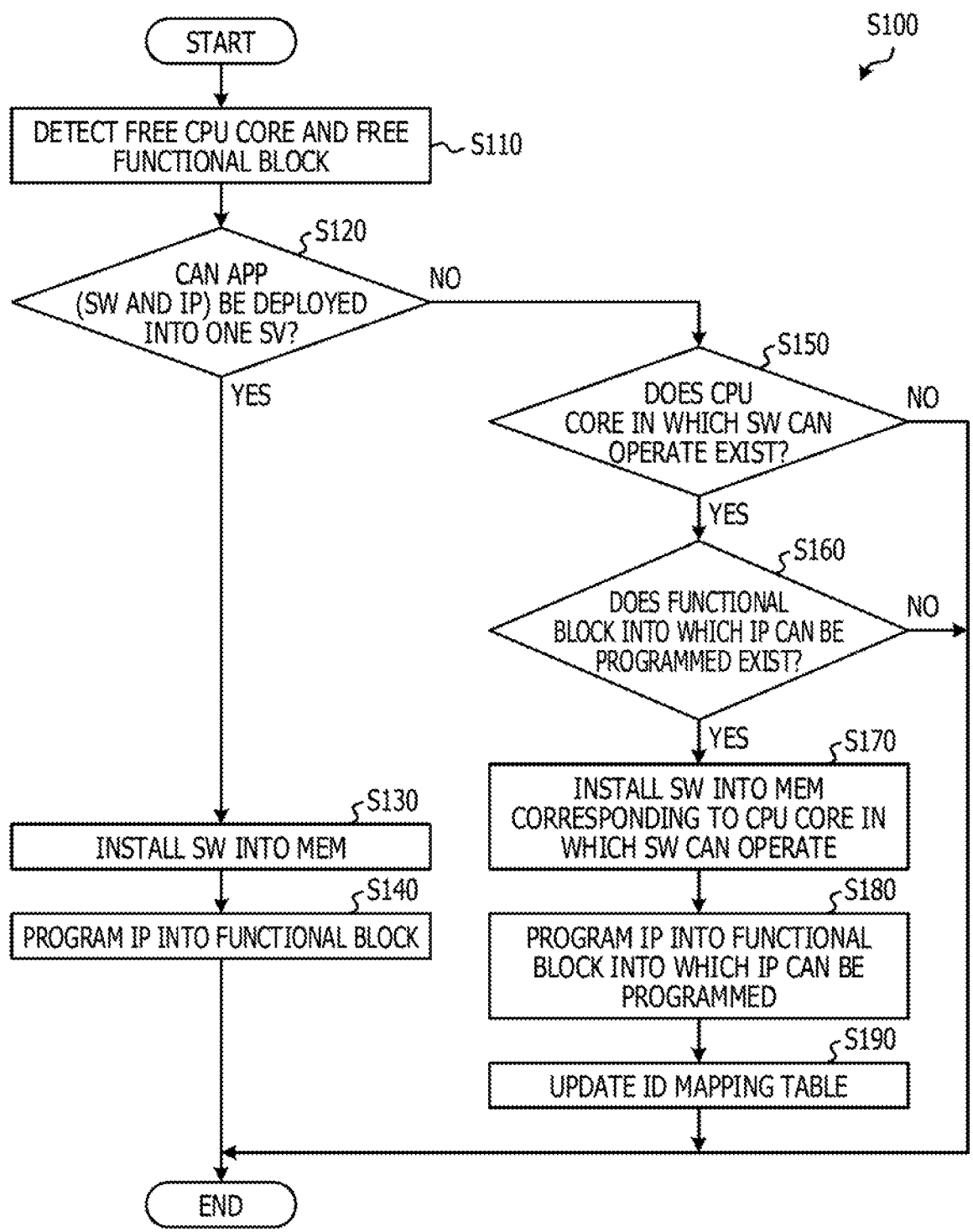
FIG. 16 is a flow chart illustrating an example of a process at step S100 depicted in FIG. 15.

FIG. 16 illustrates an example of the process at step S100 depicted in FIG. 15.

First at step S110, the management server MSV refers to the management table MTBL to detect a free CPU core CR and a free functional block BLK.

Then at step S120, the management server MSV determines whether or not the application APP (SW and IP) can be deployed into one server SV. If the software SW and the IP core IP can be deployed into one server SV, the processing advances to step S130. If the software SW and the IP core IP are deployed into servers SV different from each other, the processing advances to step S150.

At step S130, the management server MSV installs the software SW of the application APP to be deployed newly into the HDD of the server SV determined at step S120. It is to be noted that, if the software SW of the application APP to be deployed newly is installed already in the HDD, the process at step S130 is omitted.

Then at step S140, the management server MSV programs the IP core IP into the free functional block BLK of the user logic unit ULG of the server SV determined at step S120. Consequently, operation of the application APP deployed newly on the information processing system SYS2 is enabled.

On the other hand, where the software SW and the IP core IP are deployed into different servers SV, the management server MSV determines at step S150 whether or not a CPU core CR in which the software SW can operate exists. If a CPU core CR in which the software SW can operate exists, the processing advances to step S160. If a CPU core CR in which the software SW can operate does not exist, since it is difficult to deploy the application APP, the processing is ended.

At step S160, the management server MSV determines whether or not a functional block BLK into which the IP core IP can be programmed exists. If a functional block BLK into which the IP core IP can be programmed exists, the processing advances to step S170. If a functional block BLK into which the IP core IP can be programmed does not exist, since it is difficult to deploy the application APP, the processing is ended.

At step S170, the management server MSV installs the software SW of the application APP to be deployed newly into an HDD corresponding to one of the CPU cores CR determined at step S150 in which the software SW can operate. If the software SW of the application APP to be deployed newly is installed already in the HDD, the process at step S170 is omitted.

Then at step S180, the management server MSV programs the IP core IP into one of the functional blocks BLK determined at step S160 into which the IP core IP can be programmed.

Then at step S190, the management server MSV updates the correspondence tables TBLA and TBLB of the ID mapping table IDMTBL illustrated in FIG. 11 based on the application APP (SW and IP) deployed newly, and ends the processing.

Thus, also in the embodiment depicted in FIGS. 3 to 16, advantageous effects similar to those achieved by the embodiment depicted in FIG. 1 may be achieved. For example, software SW and an IP core IP may be deployed into a plurality of servers SV without degrading the processing performance of the software SW executed by the CPU. Further by providing a router unit RT in each server SV and coupling the router units RT to each other, it may be possible to efficiently deploy software SW and an IP core IP dispersedly into a plurality of servers SV, and the performance of the information processing system SYS2 may be improved.

Further, in the embodiment depicted in FIGS. 3 to 16, by incorporating a router unit RT for re-construction in a programmable unit FPGA, transfer of information between the router unit RT and the user logic unit ULG may be executed within an FPGA chip. Consequently, in comparison with an alternative case in which a router unit RT and a user logic unit ULG are incorporated in semiconductor chips different from each other, transfer of information between the router unit RT and the user logic unit ULG may be executed at a high speed.

By assigning software SW for each CPU core CR, it may be possible to manage deployment of applications APP by the management server MSV using the management table MTBL that is simple and easy.

By the ID mapping table IDMTBL depicted in FIG. 11, also where an IP core IP corresponding to software SW is deployed into the own node or a different node, information may be transferred with certainty between the CPU core CR by which the software SW is executed and the IP core IP.

Also where software SW and an IP core IP are deployed across servers SV through a plurality of router units RT, it may be possible to provide a cloud service using an existing application APP (SW and IP) as it is. Also where the number of CPU cores CR or the number of functional blocks BLK of the user logic unit ULG is changed in any server SV, practical use of the information processing system SYS2 may be continued by changing the management table MTBL.

Further, where a server SV is additionally provided or deleted, practical use of the information processing system SYS2 may be continued by changing the management table MTBL and the routing table RTTBL in accordance with the server SV additionally provided or deleted.

Figure 17:
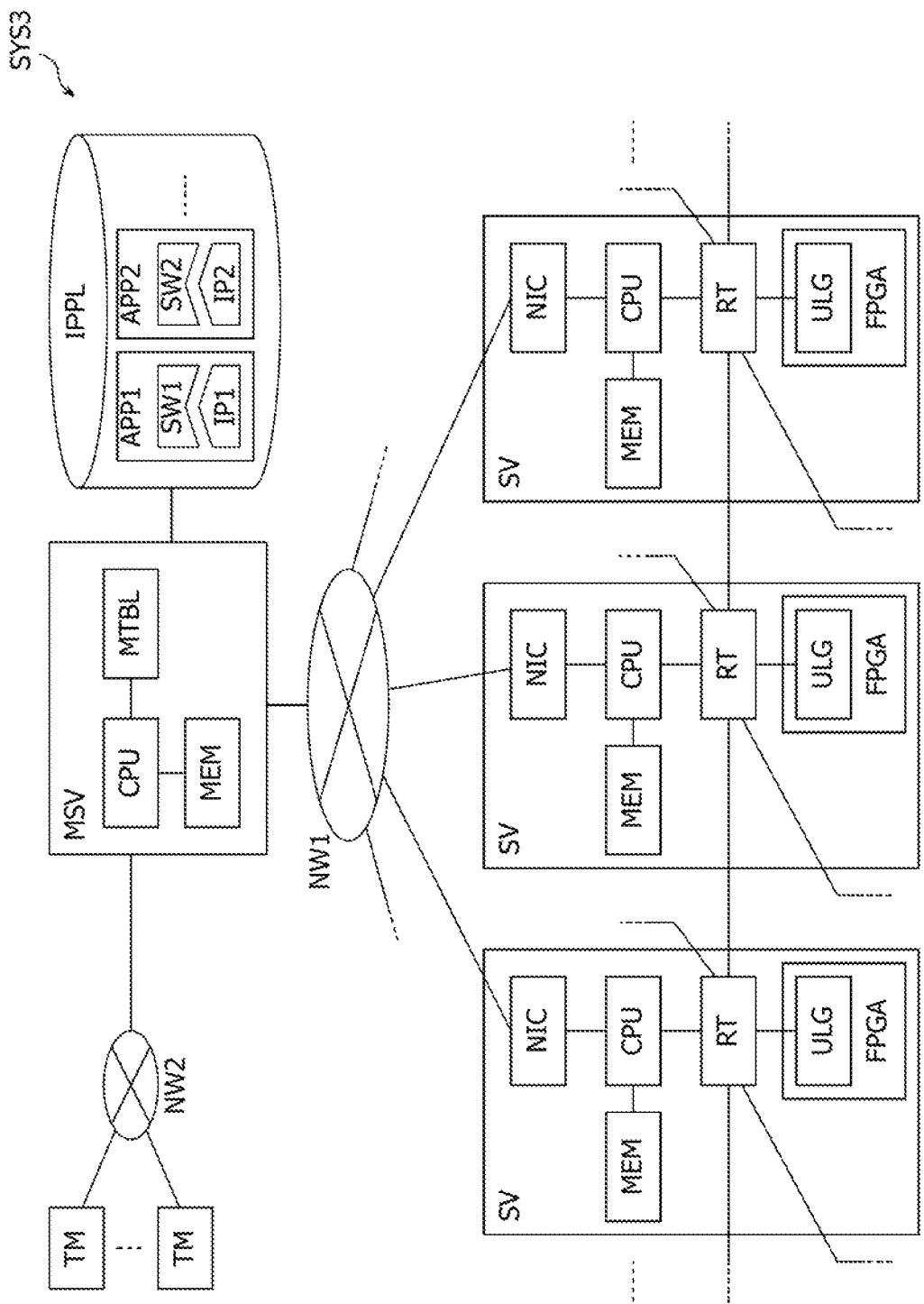
FIG. 17 is a block diagram depicting a further embodiment of an information processing apparatus, an information processing system, a control method for an information processing system and a control program for an information processing system.

FIG. 17 depicts a further embodiment of an information processing apparatus, an information processing system, a control method for an information processing system and a control program for an information processing system. Same or like elements to those described in connection with FIGS.

1 to 16 are denoted by the same reference symbols, and detailed description of them is omitted herein.

An information processing system SYS3 depicted in FIG. 17 is similar to the information processing system SYS2 depicted in FIG. 3 except that the router unit RT of each server SV is provided outside the programmable unit FPGA. For example, the router unit RT is provided in a semiconductor chip different from the FPGA chip, and the programmable unit FPGA includes a user logic unit ULG into which an IP core IP is programmed. Operation of the information processing system SYS3 is same as or similar to that of FIGS. 14 to 16. FIGS. 15 and 16 illustrate an example of a control method for the information processing system SYS3 and a control program for the information processing system SYS3.

Thus, also in the embodiment depicted in FIG. 17, advantageous effects similar to those achieved by the embodiments depicted in FIGS. 1 to 16 may be achieved. For example, software SW and an IP core IP may be deployed into a plurality of servers SV without degrading the processing performance of the software SW executed by the CPU. Further by providing a router unit RT in each server SV and coupling the router units RT to each other, it may be possible to efficiently deploy software SW and an IP core IP dispersedly into a plurality of servers SV, and the performance of the information processing system SYS3 may be improved.

Further, deployment of an application APP by the management server MSV may be managed with the management table MTBL that is simple and easy. Information may be transferred with certainty between a CPU core CR that executes software SW and an IP core IP using the ID mapping table IDMTBL illustrated in FIG. 11. A cloud service may be provided using an existing application APP (SW and IP) as it is. Also where the hardware configuration of any server SV is changed, practical use of the information processing system SYS3 may be continued by changing the management table MTBL and the routing table RTTBL.

Figure 18:
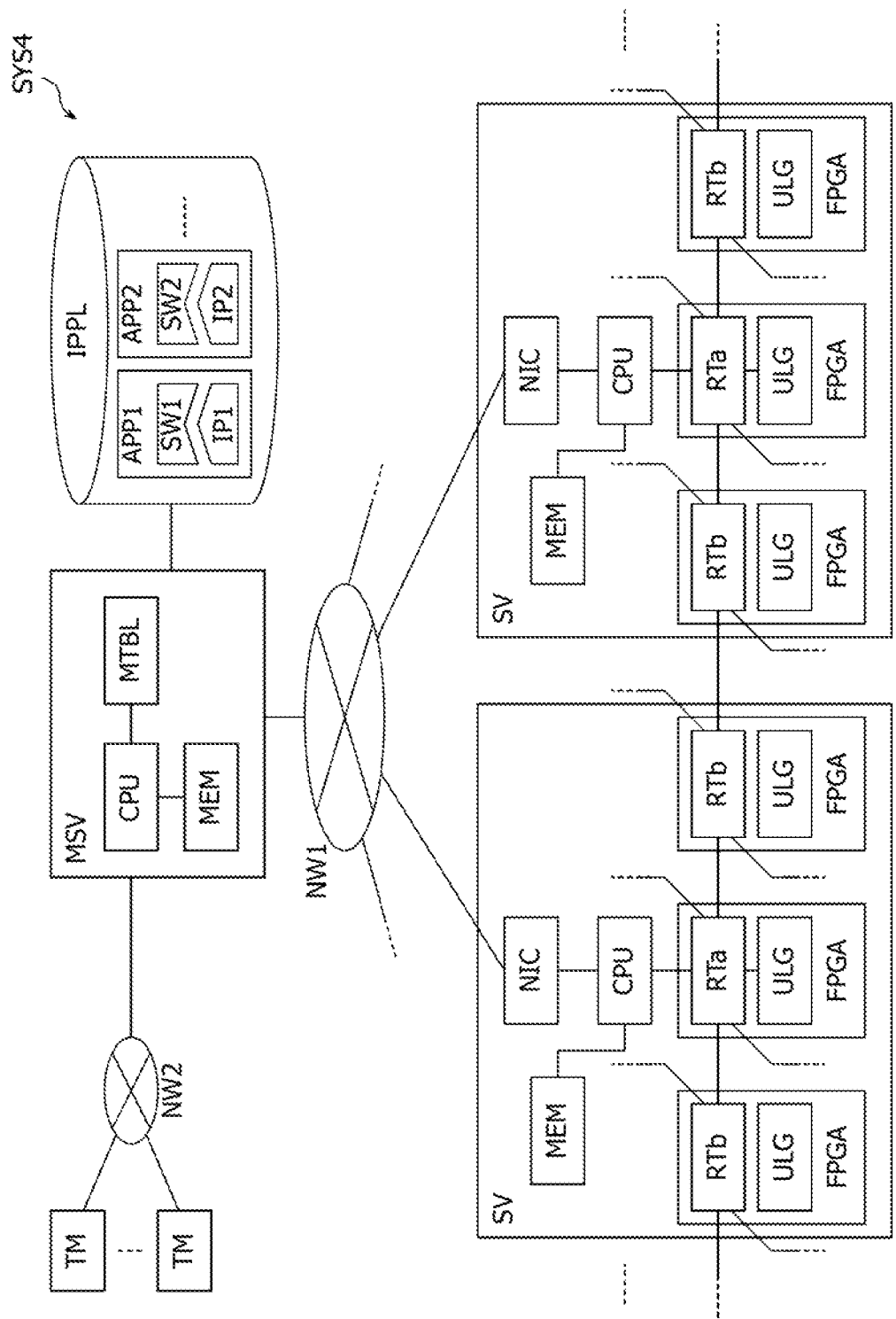
FIG. 18 is a block diagram depicting a still further embodiment of an information processing apparatus, an information processing system, a control method for an information processing system and a control program for an information processing system.

FIG. 18 depicts a still further embodiment of an information processing apparatus, an information processing system, a control method for an information processing system and a control program for an information processing system. Same or like elements to those described in connection with FIGS. 1 to 16 are denoted by the same reference symbols, and detailed description of them is omitted herein.

Figure 19:
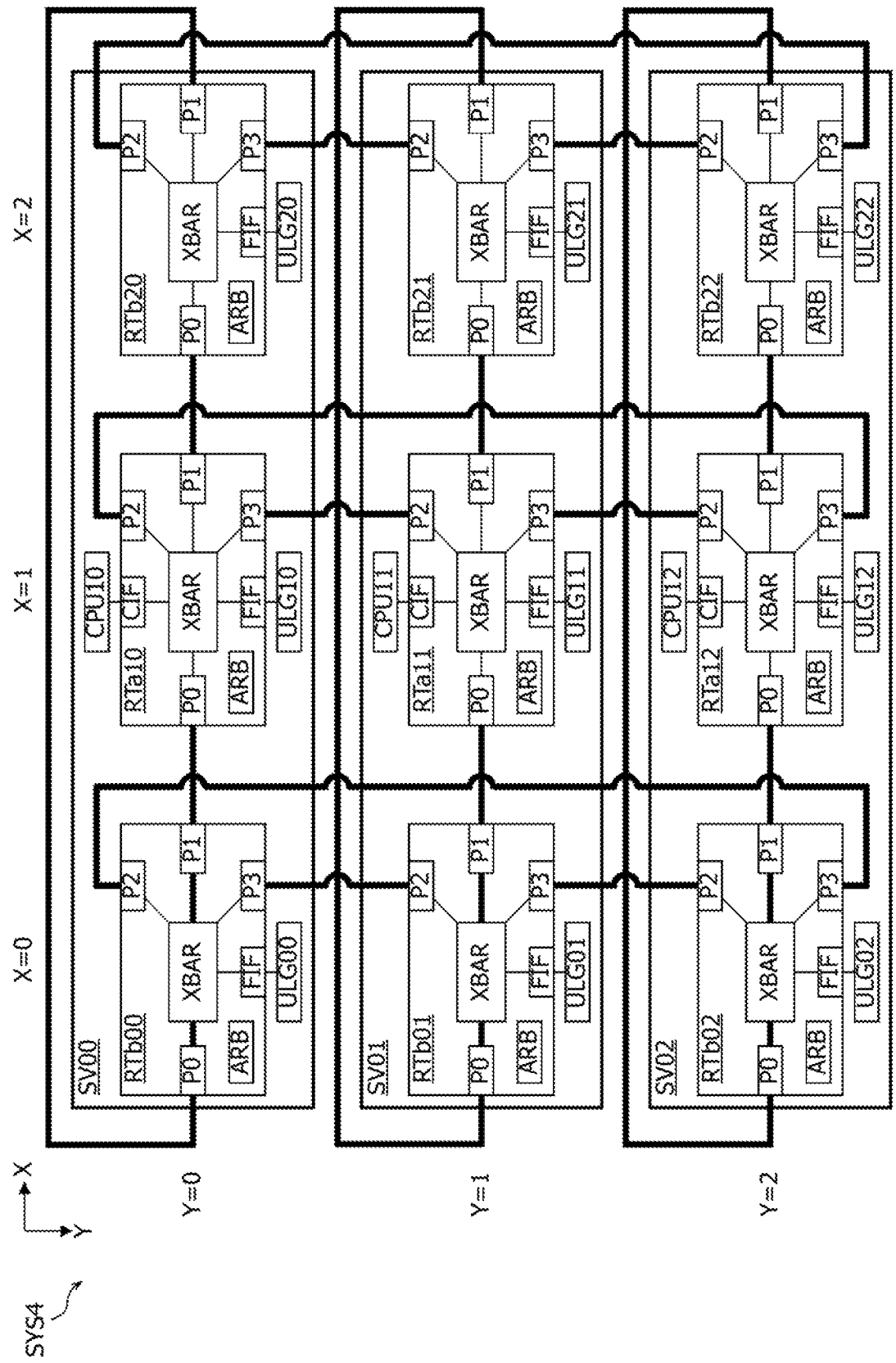
FIG. 19 is a block diagram illustrating an example of coupling between servers by router units depicted in FIG. 18.

An information processing system SYS4 depicted in FIG. 18 is similar to the information processing system SYS2 depicted in FIG. 3 except that the configuration of each of the servers SV is different from the configuration of the server SV depicted in FIG. 3. Each server SV includes a router unit RTa coupled directly to the CPU and another router unit RTb coupled to the CPU through the router unit RTa. The router units RTa and RTb are each incorporated in an FPGA chip together with the user logic unit ULG. Since each server SV includes a plurality of router units RTa and RTb, the router units RTa and RTb in the information processing system SYS4 are coupled to each other by a two-dimensional torus network. An example of coupling between the servers SV is illustrated in FIG. 19.

The router unit RTa includes a configuration same as that of the router unit RT depicted in FIG. 5 except that the routing table RTTBL and the ID mapping table IDMTBL of the arbitration unit ARB are different. The router unit RTb includes a configuration equivalent to that of the router unit RT depicted in FIG. 5 from which the interface unit CIF is removed. However, since the router unit RTb does not directly receive a packet from the CPU, the ID mapping table IDMTBL of the router unit RTb does not include the correspondence table TBLA depicted in FIG. 11.

In FIG. 18, the number of router units RT (RTa or RTb) incorporated in each server SV is increased from that in FIG. 3, and therefore, the routing table RTTBL of the router units RTa and RTb has a greater number (row number) of entries than that in the routing table RTTBL depicted in FIG. 5. The information processing system SYS4 operates in a similar manner to FIGS. 15 and 16. FIGS. 15 and 16 illustrate an example of a control method for the information processing system SYS4 and a control program for the information processing system SYS4.

By providing a plurality of router units RTa and RTb and a user logic unit ULG coupled to each of the router units RTa and RTb in each server SV, the number of IP cores IP that can be deployed into each server SV may be increased from that in FIG. 3. Consequently, also where a plurality of IP cores IP having a great circuit scale are incorporated into the user logic unit ULG, the possibility that the functional blocks BLK into which the IP cores IP are programmed may become short may be lowered. For example, such a failure that, although some CPU core CR is free, an application APP is not deployed arising from the fact that it is difficult to deploy an IP core IP due to shortage of a functional block BLK may be suppressed.

Further, by providing a plurality of router units RTa and RTb and a plurality of user logic units ULG in each server SV, the possibility that an application APP (SW and IP) can be deployed in the own node may be enhanced. Consequently, in comparison with an alternative case in which an application APP (SW and IP) is deployed across a plurality of nodes, the transfer speed of information between the software SW and the IP core IP may be raised, and the performance of the application APP may be improved.

FIG. 19 illustrates an example of coupling between servers SV by the router units RT depicted in FIG. 18. Detailed description of the same elements as those in FIG. 7 is omitted herein. In the example illustrated in FIG. 19, the information processing system SYS4 includes three servers SV00, SV01 and SV02, and each server SV includes three router units RT (RTb00, RTa10 and RTb20, or the like) arrayed in the X direction. The router units RT are coupled to each other by two-dimensional torus coupling. It is to be noted that the number of servers SV incorporated in the information processing system SYS4 is not limited to three, and the coupling scheme of the router units RT is not limited to the two-dimensional torus coupling.

Thus, also in the embodiment depicted in FIGS. 18 and 19, advantageous effects similar to those achieved by the embodiments depicted in FIGS. 1 to 16 may be achieved. For example, software SW and an IP core IP may be deployed into a plurality of servers SV without degrading the processing performance of the software SW executed by the CPU. Further, by providing a router unit RT in each server SV and coupling the router units RT to each other, it may be possible to efficiently deploy software SW and an IP core IP dispersedly into a plurality of servers SV, and the performance of the information processing system SYS4 may be improved.

By incorporating a router unit RT for re-construction in a programmable unit FPGA, transfer of information between the router unit RT and the user logic unit ULG may be executed at a high speed. With the management table MTBL that is simple and easy, deployment of applications APP by the management server MSV may be managed. With the ID mapping table IDMTBL depicted in FIG. 11, information may be transferred with certainty between a CPU core CR by which software SW is executed and an IP core IP. A cloud service may be provided using an existing application APP (SW and IP) as it is. Also when the hardware configuration of any server SV is changed, practical use of the information processing system SYS4 may be continued by changing the management table MTBL and the routing table RTTBL.

Furthermore, with the embodiment depicted in FIGS. 18 and 19, the following advantageous effects may be achieved. For example, by providing a plurality of router units RTa and RTb and a plurality of user logic units ULG in each server SV, such a failure that, although a CPU core CR is free, an application APP is not deployed due to shortage of a functional block BLK may be suppressed. Further, the possibility that an application APP (SW and IP) can be deployed in an own node may be increased. Consequently, in comparison with an alternative case in which an application APP (SW and IP) is deployed across a plurality of nodes, the transfer speed of information between the software SW and the IP core IP may be made high, and the performance of the application APP may be improved.

Figure 20:
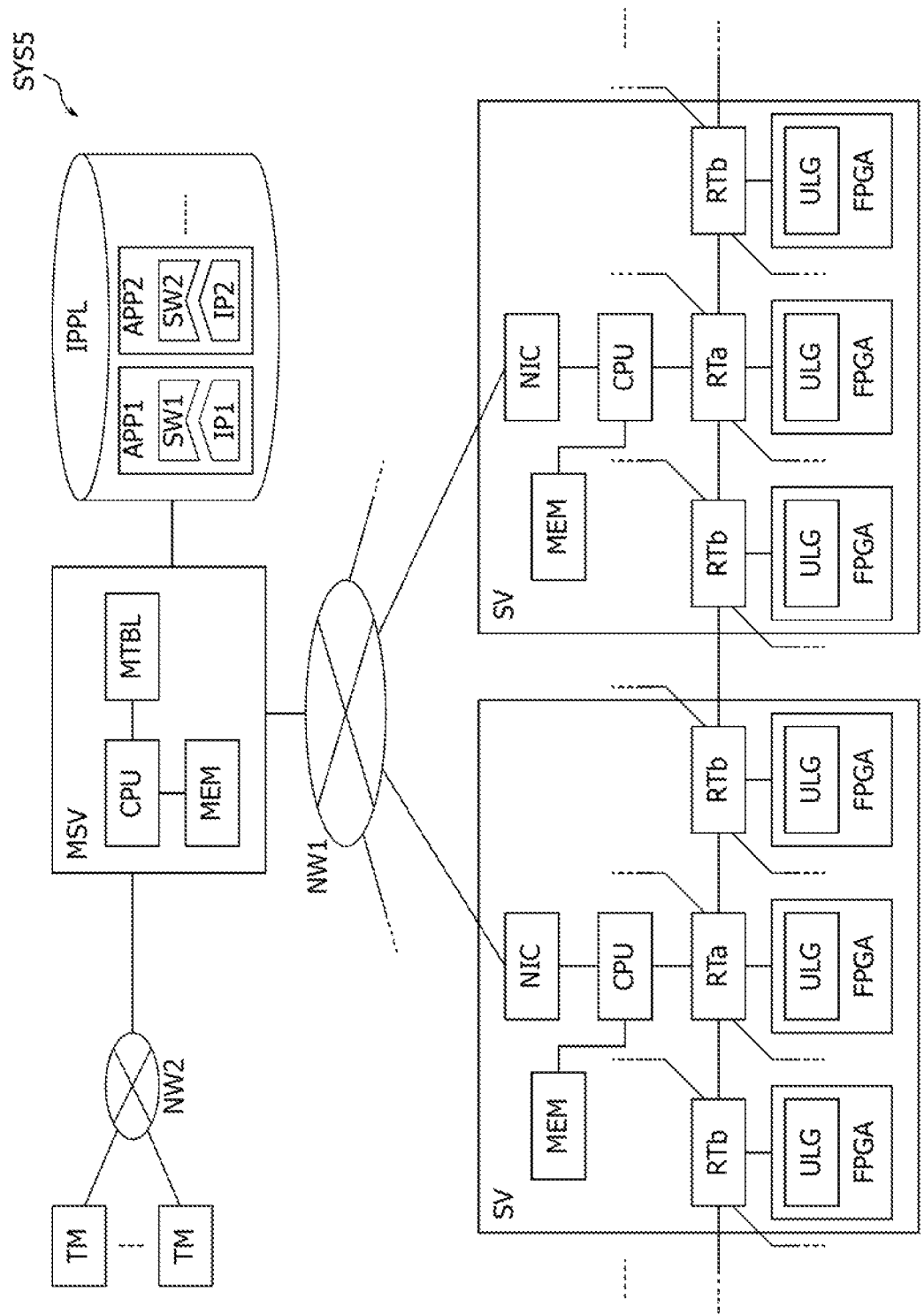
FIG. 20 is a block diagram depicting a yet further embodiment of an information processing apparatus, an information processing system, a control method for an information processing system and a control program for an information processing system.

FIG. 20 depicts a yet further embodiment of an information processing apparatus, an information processing system, a control method for an information processing system and a control program for an information processing system. Same or like elements to those described in connection with FIGS. 1 to 19 are denoted by the same reference symbols, and detailed description of them is omitted herein.

An information processing system SYS5 depicted in FIG. 20 is similar to the information processing system SYS2 depicted in FIG. 3 except that the configuration of each server SV is different from the configuration of the server SV depicted in FIG. 3. For example, each server SV includes a router unit RTa coupled directly to the CPU and another router unit RTb coupled to the CPU through the router unit RTa similarly as in FIG. 18. Further, the router unit RT of each server SV is provided outside the programmable unit FPGA similarly as in FIG. 17, and the programmable unit FPGA includes a user logic unit ULG into which an IP core IP is programmed.

The information processing system SYS5 operates in a similar manner to FIGS. 15 and 16. FIGS. 15 and 16 illustrate an example of a control method for the information processing system SYS5 and a control program for the information processing system SYS5. Thus, also with the embodiment depicted in FIG. 20, advantageous effects similar to those achieved by the embodiments depicted in FIGS. 1 to 19 may be achieved.

Figure 21:
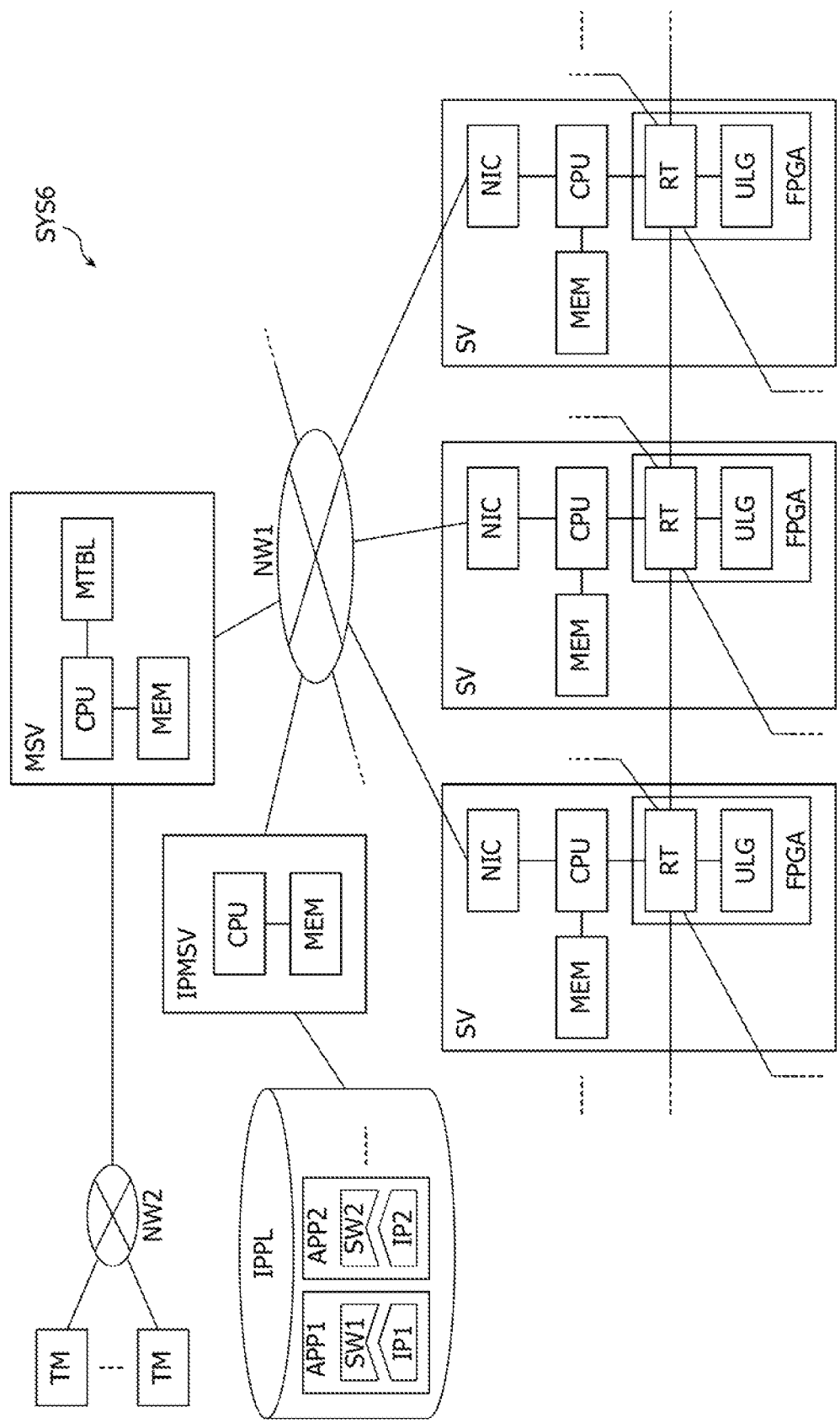
FIG. 21 is a block diagram depicting a yet further embodiment of an information processing apparatus, an information processing system, a control method for an information processing system and a control program for an information processing system.

FIG. 21 depicts a yet further embodiment of an information processing apparatus, an information processing system, a control method for an information processing system and a control program for an information processing system. Same or like elements to those described in connection with FIGS. 1 to 16 are denoted by the same reference symbols, and detailed description of them is omitted herein.

An information processing system SYS6 depicted in FIG. 21 does not include the IP pool IPPL, and the IP pool IPPL is managed by an IP management server IPMSV coupled to the network NW1. The IP management server IPMSV is installed outside the information processing system SYS6 and executes management for registering an application APP into the IP pool IPPL. It is to be noted that the IP management server IPMSV may be coupled to the network NW2.

Each server SV includes a configuration similar to that of the server SV depicted in FIG. 3. The management server MSV has functions similar to those of the management server MSV depicted in FIG. 3 except that it does not have the function for registering an application APP into the IP pool IPPL and the function for managing applications APP stored in the IP pool IPPL. It is to be noted, however, that the management server MSV has a function for issuing an instruction to deploy an application APP and an instruction to delete an application APP to the IP management server IPMSV.

The information processing system SYS6 operates in a similar manner to FIGS. 15 and 16. FIGS. 15 and 16 illustrate an example of a control method for the information processing system SYS6 and a control program for the information processing system SYS6. It is to be noted, however, that the processes at steps S130, S140, S170, S180 and S190 of FIG. 16 are executed by the IP management server IPMSV that has received an instruction for deployment of an application APP from the management server MSV. It is to be noted that also the processes at steps S30, S40 and S50 of FIG. 15 may be executed by the IP management server IPMSV that has received an instruction for deletion of an application APP from the management server MSV.

Since the IP pool IPPL is managed by the IP management server IPMSV while the management server MSV concentrates on the process for deployment of an application APP, applications APP may be deployed efficiently into the servers SV in comparison with the information processing system SYS2 depicted in FIG. 3.

The management server MSV, IP management server IPMSV and servers SV may be disposed at the same place or may be disposed at places spaced away from each other. For example, a business person who provides a cloud service using the management server MSV and the servers SV and a business person who provides applications APP to the business person of the cloud service may be different from each other.

It is to be noted that the information processing system SYS6 may include a different IP pool IPPL coupled to the management server MSV. For example, the information processing system SYS6 may include, in addition to the system configuration depicted in FIG. 3, an IP management server IPMSV coupled to the network NW1 and an IP pool IPPL managed by the IP management server IPMSV. By the information processing system SYS6, in comparison with an alternative case in which the IP management server IPMSV is not coupled to the network NW1, an application APP developed newly by a different business person or the like may be provided rapidly to a user who operates a terminal device TM, and the convenience to the user may be improved.

Thus, also in the embodiment depicted in FIG. 21, advantageous effects similar to those achieved by the embodiments depicted in FIGS. 1 to 16 may be achieved. For example, software SW and an IP core IP may be deployed into a plurality of servers SV without degrading the processing performance of the software SW executed by the CPU. Further, by providing a router unit RT in each server SV and coupling the router units RT to each other, it may be possible to efficiently deploy software SW and an IP core IP dispersedly into a plurality of servers SV, and the performance of the information processing system SYS6 may be improved.

By incorporating a router unit RT for re-construction in a programmable unit FPGA, transfer of information between the router unit RT and the user logic unit ULG may be executed at a high speed. With the management table MTBL that is simple and easy, deployment of applications APP by the management server MSV may be managed. With the ID mapping table IDMTBL depicted in FIG. 11, information may be transferred with certainty between a CPU core CR by which software SW is executed and an IP core IP. A cloud service may be provided using an existing application APP (SW and IP) as it is. Also when the hardware configuration of any server SV is changed, practical use of the information processing system SYS6 may be continued by changing the management table MTBL and the routing table RTTBL.

Furthermore, in the embodiment depicted in FIG. 21, by causing the IP pool IPPL to be managed by the IP management server IPMSV, the management server MSV may deploy applications APP efficiently into the servers SV in comparison with the management server MSV depicted in FIG. 3.

Figure 22:
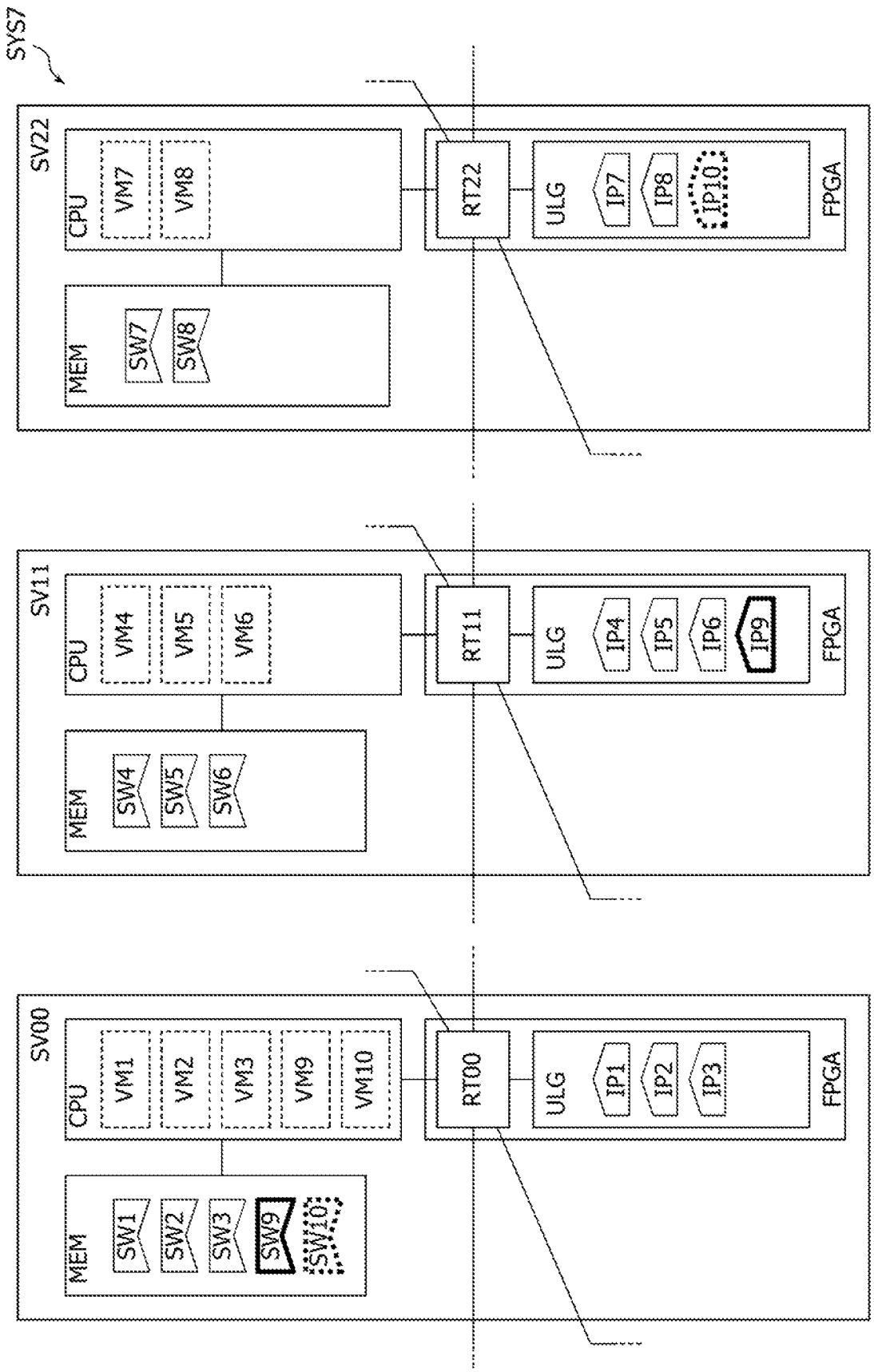
FIG. 22 is a view illustrating an example of applications deployed in servers in a yet further embodiment of an information processing apparatus, an information processing system, a control method for an information processing system and a control program for an information processing system.

FIG. 22 depicts an example of applications deployed in servers in a yet further embodiment of an information processing apparatus, an information processing system, a control method for an information processing system and a control program for an information processing system. Same or like elements to those described in connection with FIGS. 1 to 16 are denoted by the same reference symbols, and detailed description of them is omitted herein.

In an information processing system SYS7 depicted in FIG. 22, the CPU of each server SV activates a virtual machine VM and software SW is executed by the virtual machine VM. Further, in the information processing system SYS7, control of deployment of applications APP by the management server MSV is different from the control of deployment of applications APP by the management server MSV depicted in FIG. 3. The other elements of the information processing system SYS7 are similar to those of the information processing system SYS2 depicted in FIG. 3, information processing system SYS3 depicted in FIG. 17, information processing system SYS4 depicted in FIG. 18, information processing system SYS5 depicted in FIG. 20 and information processing system SYS6 depicted in FIG. 21.

In FIG. 22, digits added to the tail of the reference symbols of pieces of software SW, virtual machines VM and IP cores IP indicate a corresponding relationship among the elements mentioned. For example, the software SW1 and the IP core IP1 are included in one application APP, and software SW1 is executed by the virtual machine VM1. The software SW9 and the IP core IP9 each indicated by a thick solid line and the software SW10 and the IP core IP10 each indicated by a thick broken line indicate that they are deployed across two servers SV similarly as in FIG. 8.

The management server MSV of the information processing system SYS7 includes a management table MTBL similar to that of FIG. 9. However, the management table MTBL includes, for each virtual machine VM in each server SV, a flag area FLG for storing information indicative of use/non-use of the virtual machine VM and an SW name area for storing information indicative of a name of software SW to be operated. By assigning software SW for each virtual machine VM, it may be possible to manage deployment of applications APP by the management server MSV using the management table MTBL that is simple and easy.

Figure 23:
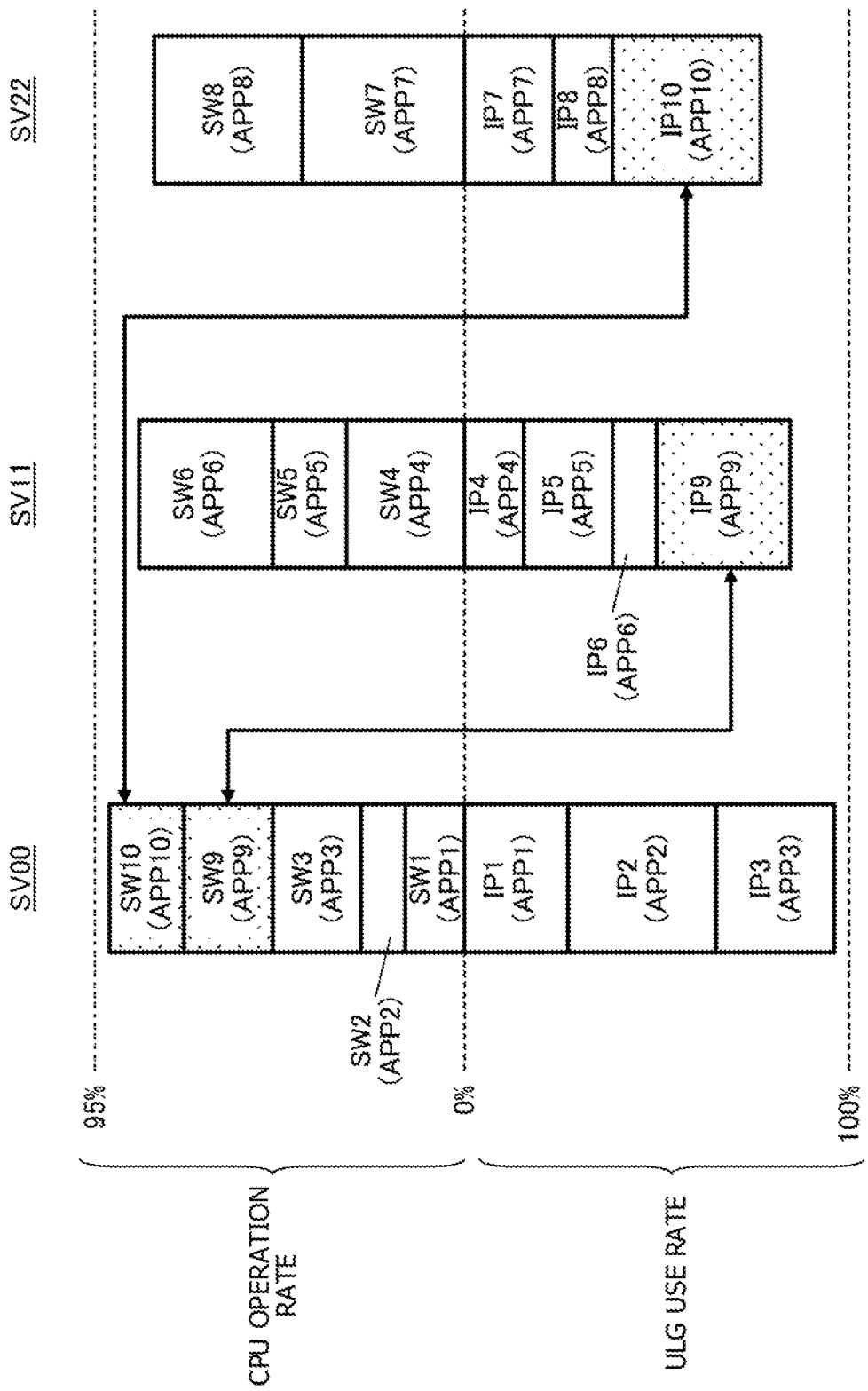
FIG. 23 is a view illustrating an example of a state in which the applications illustrated in FIG. 22 are deployed.

FIG. 23 illustrates an example of a state in which the applications APP depicted in FIG. 22 are deployed. Detailed description of the same elements as those in FIG. 13 is omitted herein. FIG. 23 illustrates a state in which an application APP9 (SW9 and IP9) and another application APP10 (SW10 and IP10) indicated by dots are deployed newly.

In the information processing system SYS7 depicted in FIG. 22, the management server MSV determines a server SV in which software SW is executed by a virtual machine VM based on an operation rate of the CPU. For example, if it is predicted that the operation rate of the CPU when a virtual machine VM is newly activated to execute software SW is equal to or lower than 95%, the management server MSV determines that it is possible to activate the virtual machine VM to execute the software SW. Further, the management server MSV determines a user logic unit ULG into which the IP core IP is incorporated based on a use rate of the user logic unit ULG. For example, if it is predicted that the use rate of the user logic unit ULG when a new IP core IP is programmed is equal to or lower than 100%, the management server MSV determines that the IP core IP is programmable.

In the example illustrated in FIG. 23, the management server MSV predicts that, if the software SW9 of the application APP9 whose deployment is requested from a terminal device TM is executed by the CPU of the server SV00, the operation rate of the CPU is equal to or lower than 95%. On the other hand, the management server MSV predicts that, if the software SW9 is executed by the CPU of the server SV11 or the server SV22, the operation rate of the CPU exceeds 95%. Therefore, the management server MSV activates the virtual machine VM on the CPU of the server SV00 and causes the activated virtual machine VM to execute the software SW9. Similarly, the management server MSV causes the software SW10 to be executed by the virtual machine VM activated newly on the CPU of the server SV00 that is executing the software SW9.

On the other hand, the management server MSV predicts that, if the IP core IP of the application APP9 whose deployment is requested from a terminal device TM is programmed into the user logic unit ULG of the server SV00, the use rate of the user logic unit ULG exceeds 100%. On the other hand, the management server MSV predicts that, if the IP core IP9 is programmed into the user logic unit ULG of the server SV11 or the server SV22, the use rate of the user logic unit ULG is equal to or lower than 100%. Therefore, the management server MSV programs the IP core IP9 into the user logic unit ULG of the server SV11. Further, after the IP core IP9 is programmed, the management server MSV programs the IP core IP10 into the user logic unit ULG of the server SV22.

It is to be noted that the management server MSV may program an IP core IP into the user logic unit ULG in response to the number of unused functional blocks BLK as illustrated in FIGS. 12 and 13.

Figure 24:
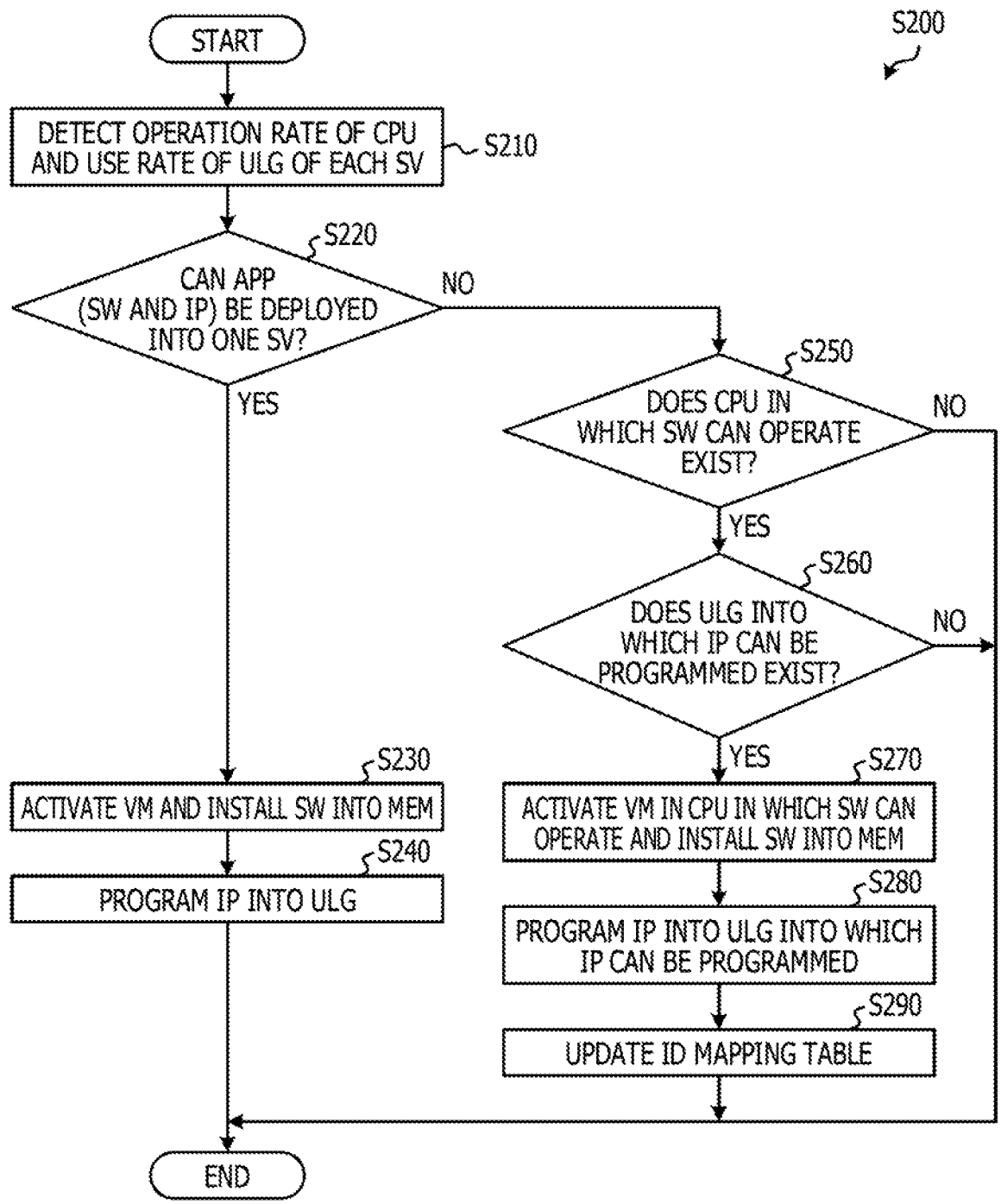
FIG. 24 is a flow chart illustrating an example of a deployment process of an application executed by a management server of the information processing system depicted in FIG. 22.

FIG. 24 illustrates an example of a deployment process of an application APP executed by the management server MSV of the information processing system SYS7 depicted in FIG. 22. Detailed description of processes same as those in FIG. 16 is omitted herein.

The operation illustrated in FIG. 24 is implemented by a control program executed by the information processing system SYS7 depicted in FIG. 22. FIG. 24 illustrates an example of a control method for the information processing system SYS7 and the control program for the information processing system SYS7. Further, the management server MSV of the information processing system SYS7 depicted in FIG. 22 executes the process illustrated in FIG. 15 and executes a process at step S200 depicted in FIG. 24 in place of the process at step S100 depicted in FIG. 15.

First at step S210, the management server MSV detects an operation rate of the CPU and a use rate of the user logic unit ULG in each server SV.

Then at step S220, the management server MSV determines whether or not an application APP (SW and IP) can be deployed into one server SV similarly as at step S120 depicted in FIG. 16. If the software SW and the IP core IP can be deployed into one server SV, the processing advances to step S230. If the software SW and the IP core IP are deployed in servers SV different from each other, the processing advances to step S250.

At step S230, the management server MSV activates a virtual machine VM in the CPU of the server SV determined at step S220 and installs the software SW of the application APP to be deployed newly into the HDD of the server SV determined at step S220.

Then at step S240, the management server MSV programs the IP core IP into the user logic unit ULG of the server SV determined at step S220. Consequently, operation of the application APP deployed newly on the information processing system SYS7 is enabled.

On the other hand, if the software SW and the IP core IP are deployed into servers SV different from each other, the management server MSV determines at step S250 whether or not a CPU or CPUs in which the software SW can operate exist. For example, the management server MSV determines, also where the software SW of the application APP to be deployed newly is executed on the virtual machine VM of the CPU, whether or not the operation rate of the CPU becomes equal to or lower than 95%. If a CPU or CPUs in which the software SW can operate exist, the processing advances to step S260. If a CPU in which the software SW can operate does not exist, the processing is ended because it is difficult to deploy the application APP.

At step S260, the management server MSV determines whether or not there exists a user logic unit or units ULG into which the IP core IP may be programmed. For example, the management server MSV determines, also when the IP core IP of the application APP to be deployed newly is programmed into a user logic unit ULG, whether or not the use rate of the user logic unit ULG becomes equal to or lower than 100%. If there exists a user logic unit or units ULG into which the IP core IP can be programmed, the processing advances to step S270. If there does not exist a user logic unit ULG into which the IP core IP can be programmed, the processing is ended because it is difficult to deploy the application APP.

At step S270, the management server MSV activates the virtual machine VM on a CPU by which the software SW is executed from among the CPUs determined at step S250 in which the software SW can operate. Further, the management server MSV installs the software SW of the application APP to be deployed newly into the HDD of the server SV in which the virtual machine VM is activated.

Then at step S280, the management server MSV programs the IP core IP into one of the user logic units ULG determined at step S260 into which the IP core IP can be programmed.

Then at step S290, the management server MSV updates the correspondence tables TBLA and TBLB of the ID mapping table IDMTBL illustrated in FIG. 11 based on the application APP (SW and IP) deployed newly, and ends the processing.

As described above, also in the embodiment depicted in FIGS. 22 to 24, advantageous effects similar to those achieved by the embodiments depicted in FIGS. 1 to 21 may be achieved. For example, software SW and an IP core IP may be deployed into a plurality of servers SV without degrading the processing performance of the software SW executed by the CPU. Further, by providing a router unit RT in each server SV and coupling the router units RT to each other, it may be possible to efficiently deploy software SW and an IP core IP dispersedly into a plurality of servers SV, and the performance of the information processing system SYS7 may be improved.

By incorporating a router unit RT for re-construction in a programmable unit FPGA, transfer of information between the router unit RT and the user logic unit ULG may be executed at a high speed. With the ID mapping table IDMTBL depicted in FIG. 11, information may be transferred with certainty between a virtual machine VM that executes software SW and an IP core IP. A cloud service may be provided using an existing application APP (SW and IP) as it is. Also when the hardware configuration of any server SV is changed, practical use of the information processing system SYS7 may be continued by changing the management table MTBL and the routing table RTTBL.

Further, in the embodiment depicted in FIGS. 22 to 24, by assigning software SW for each virtual machine VM, deployment of applications APP by the management server MSV may be managed using the management table MTBL that is simple and easy.

From the foregoing detailed description, characteristics and advantages of the embodiments will become clear. It is intended by this that the claims embrace such characteristics and advantages of the embodiments as described above without departing from the spirit and scope of the claims. Further, those having an ordinary skill in the technical field could readily conceive any improvement and alteration. Accordingly, it is not intended to limit the scope of embodiments having inventiveness to those described above, and also it is possible for the claims to rely upon suitable improvements and equivalents included in the range disclosed in the embodiments. For example, the steps recited in any of the method or process descriptions may be executed in any order and are not limited to the order presented.

What is claimed is:

1. An information processing device comprising:
  at least one circuit board installed in the information processing device;
  a processor mounted on the at least one circuit board, the processor being configured to execute a program;
  a plurality of first programmable circuits, each of the plurality of the first programmable circuits being mounted on the at least one circuit board and being configured to logically form a processing circuit and a router circuit and being configured to execute data processing in accordance with an instruction from the processor,
  wherein the router circuit is coupled to the processor, the first programmable, and a router circuit of other information processing device,
  wherein the router circuit is configured to execute a routing process of information transferred between the processor and the processing circuit logically formed in the first programmable circuit device or between the processor and a processing circuit logically formed in a first programmable circuit of the other information processing device,
  wherein the router circuit logically formed in one of the plurality of the first programmable circuits is coupled to the processor, and
  the router circuit logically formed in other ones of the plurality of the first programmable circuits are coupled to the processor through the router circuit logically formed in the one of the plurality of the first programmable circuits.

2. The information processing device according to claim 1, further comprising:

a memory configured to store a plurality of programs to be executed by the processor;

wherein the processor includes a plurality of processor cores that issue, by individually executing the plurality of programs stored in the memory, an instruction for data processing to each of a plurality of the processing circuits programmed in the first programmable circuits, and the plurality of processing circuits that individually execute data processing in accordance with the instructions from the plurality of processor cores are programmed into the first programmable circuits of the information processing device or the first programmable circuits of the other information processing device.

3. The information processing device according to claim 1, further comprising:

a memory configured to store a plurality of programs to be executed by the processor;

wherein the processor is configured to operate a plurality of virtual machines that issue an instruction for data processing to each of a plurality of the processing circuits programmed in the first programmable circuits by individually executing the plurality of programs stored in the memory, and the plurality of processing circuits that individually execute data processing in accordance with the instructions from the plurality of virtual machines are programmed into the first programmable circuits of the information processing device or the first programmable circuits of the other information processing device.

4. The information processing device according to claim 3, wherein each of the router circuits includes a retention circuit configured to retain route information indicative of a transfer route of information transferred between the processor and one of the first programmable circuits in which the processing circuits are programmed or a transfer route of information transferred between the processor and one of the first programmable circuits of the other information processing device.

5. The information processing device according to claim 4, wherein the memory is configured to store process data used for data processing executed by the processing circuit and a process result generated by the processing circuit by execution of the data processing, and each of the router circuits executes a routing process of a transfer route of an instruction for data processing issued to the processing circuit by the processor, a readout request for process data issued to the memory from the processing circuit, process data read out from the memory into the processing circuit in accordance with the readout request and a write request of a process result issued from the processing circuit to the memory.

6. A system for processing information, the system comprising:

a plurality of information processing devices; and a management apparatus configured to manage the plurality of information processing devices, wherein an information processing device of the plurality of information processing devices includes at least one circuit board installed in the information processing device, a processor mounted on the at least one circuit board, the processor being configured to execute a program, a plurality of first programmable circuits, each of the plurality of mounted on the at least one circuit board, and being configured to logically form a processing circuit and a router circuit and being configured to execute data processing in accordance with an instruction from the processor, wherein the router circuit is coupled to the processor, the first programmable circuit, and a router circuit of other information processing device of the plurality of information processing devices, wherein the router circuit is configured to execute a routing process of information transferred between the processor and the processing circuit logically formed in the first programmable circuit of the information processing device or between the processor and a processing circuit logically formed in a first programmable circuit of the other information processing device, wherein the router circuit logically formed in one of the plurality of the first programmable circuits is coupled to the processor, and the router circuit logically formed in other ones of the plurality of the first programmable circuits are coupled to the processor through the router circuit logically formed in the one of the plurality of the first programmable circuits.

7. The system according to claim 6, wherein the management apparatus includes a situation retention circuit configured to retain information indicative of a use situation of the processor of the information processing device and information indicative of a use situation of the first programmable circuit of the information processing device.

8. The system according to claim 7, the system further comprising:

a database configured to retain a plurality of applications each of which includes a program and circuit information of the processing circuit corresponding to the program, wherein the information processing device further includes a memory configured to store a plurality of programs to be executed by the processor, wherein the management apparatus stores, in accordance with an instruction to deploy one of the plurality of applications into an information processing system, the program included in the application of a target of the instruction into a memory of one of the plurality of information processing devices and programs the circuit information of the processing circuit included in the application of the target of the instruction into the first programmable circuit of the one of the plurality of information processing devices.

9. A method for controlling an information processing system, the information processing system including a plurality of information processing apparatuses and a management apparatus configured to manage the plurality of information processing apparatuses, each of the plurality of information processing apparatuses including a processor installed in the information processing apparatus, the processor being configured to execute a program, a memory into which a program executed by the processor is stored, a plurality of first programmable circuits, each of the plurality of the first programmable circuits being installed in the information processing apparatus and being configured to logically form a processing circuit and a router circuit and being configured to execute data processing in accordance with an instruction from the processor, the router circuit being coupled to the processor, the first programmable circuit and a router circuit of other information processing apparatus, the router circuit being configured to execute a routing process of information transferred between the processor and the processing circuit logically formed in the first programmable circuit or between the processor and a first processing circuit logically formed in a first programmable circuit of the other information processing apparatus, the method comprising:

by the management apparatus, selecting, from among the plurality of information processing apparatuses, a processor capable of executing a new program and a first programmable circuit capable of programming a new processing circuit that executes data processing in accordance with an instruction from the processor that executes the new program;

by the management apparatus, controlling a storage process for storing the new program into a memory that is accessed by the selected processor;

by the management apparatus, controlling a program process for programming the new processing circuit into the selected first programmable circuit; and by the management apparatus, controlling a storage process for storing route information indicative of a transfer route of information transferred between the processor that executes the new program and the first programmable circuit into which the new processing circuit is programmed into a retention circuit provided in the router circuit.

10. The method according to claim 9, the method further comprising:

by the management apparatus, storing information of a use situation of the processor of each of the plurality of information processing apparatuses and information of a use situation of the first programmable circuit of each of the plurality of information processing apparatuses into a situation retention circuit; and by the management apparatus, selecting, based on the information stored in the situation retention circuit, a processor capable of executing the new program and a first programmable circuit into which the new processing circuit can be programmed.

11. A non-transitory computer-readable storage medium storing a program for controlling an information processing system, the information processing system including a plurality of information processing apparatuses and a management apparatus configured to manage the plurality of information processing apparatuses, each of the plurality of information processing apparatuses including at least one circuit board, a processor mounted on the at least one circuit board, the processor being configured to execute a program, a memory into which a program executed by the processor is stored, a plurality of first programmable circuits, each of the plurality of the first programmable circuits being mounted on the at least one circuit board and being configured to logically form a processing circuit and a router circuit and being configured to execute data processing in accordance with an instruction from the processor, and wherein the router circuit is coupled to the processor, the first programmable circuit and a router circuit of other information processing apparatus, wherein the router circuit is configured to execute a routing process of information transferred between the processor and the processing circuit logically formed in the first programmable circuit or between the processor and a processing circuit logically formed in a first programmable circuit of the other information processing apparatus, wherein the router circuit logically formed in one of the plurality of the first programmable circuits is coupled to the processor, wherein the router circuit logically formed in other ones of the plurality of the first programmable circuits are coupled to the processor through the router circuit logically formed in the one of the plurality of the first programmable circuits, wherein the program is configured to cause the management apparatus to execute a process, the process comprising:

selecting, from among the plurality of information processing apparatuses, a processor capable of executing a new program and a first programmable circuit capable of programming a new processing circuit that executes data processing in accordance with an instruction from the processor that executes the new program;

controlling a storage process for storing the new program into a memory that is accessed by the selected processor;

controlling a program process for programming the new processing circuit into the selected first programmable circuit; and controlling a storage process for storing route information indicative of a transfer route of information transferred between the processor that executes the new program and the first programmable circuit into which the new processing circuit is programmed into a retention circuit provided in the router circuit.

\* \* \* \* \*